United States Patent
Rackson et al.

(12) 
(10) Patent No.: US 6,415,270 B1
(45) Date of Patent: Jul. 2, 2002

(54) MULTIPLE AUCTION COORDINATION METHOD AND SYSTEM

(75) Inventors: Randall I. Rackson, Stamford, CT (US); Jonathan Adam Krane, New York, NY (US); Peter J. Trevisani, Santa Fe, NM (US)

(73) Assignee: Omnihub, Inc., New York, NY (US)

( * ) Notice: Subject to any disclaimer, the term of this patent is extended or adjusted under 35 U.S.C. 154(b) by 0 days.

(21) Appl. No.: 09/440,584

(22) Filed: Nov. 15, 1999

Related U.S. Application Data

(60) Provisional application No. 60/152,473, filed on Sep. 3, 1999.

(51) Int. Cl.[7] .............................................. G06F 17/60
(52) U.S. Cl. ........................................... 705/37; 705/36
(58) Field of Search ................................ 705/1, 10, 26, 705/37; 709/213; 707/10, 100, 104, 513

(56) References Cited

U.S. PATENT DOCUMENTS

| | | |
|---|---|---|
| 5,818,914 A | 10/1998 | Fujisaki |
| 5,835,896 A | 11/1998 | Fisher et al. |
| 5,845,265 A | 12/1998 | Woolston |
| 5,890,138 A | 3/1999 | Godin et al. |
| 5,897,620 A * | 4/1999 | Walker et al. ............... 705/5 |
| 5,905,975 A | 5/1999 | Ausubel |
| 6,006,201 A | 12/1999 | Berent et al. |
| 6,012,045 A | 1/2000 | Barzilai et al. |
| 6,023,686 A | 2/2000 | Brown |
| 6,026,383 A | 2/2000 | Ausubel |

FOREIGN PATENT DOCUMENTS

WO  WO97/16797  * 9/1997

OTHER PUBLICATIONS

Little et al, "Auctioning is the best wisest choice if you want the best value", Government Computer News, v15, n28, p54(2), Nov. 4, 1996, dialog file 148, Accession No. 09137259.*

* cited by examiner

Primary Examiner—Frantzy Poinvil
(74) Attorney, Agent, or Firm—Pennie & Edmonds LLP

(57) ABSTRACT

A multi-auction service system and method for replicating an item to be auctioned at a plurality of remote auction services, where the multi-auction service detects bids at the plurality of remote auction services for the item in order to replicate the optimal bid at each of the remote auction services such that the optimal bid is afforded to a bidder or seller.

25 Claims, 12 Drawing Sheets

Standard Auction

| Auction 1 | | Auction 2 | | Auction 3 | | Auction 4 | | Auction 5 | |
|---|---|---|---|---|---|---|---|---|---|
| Bidder | Bid | Bidder | Bid | Bidder | Bid | Bidder | Bid | Bidder | Bid |
| A | $90 | D 302 | $95 | G | $85 | J | $90 | D$^{Rep}$ | $95 |
| B | $70 | E | $65 | H | $80 | D$^{Rep}$ | $95 | | |
| C | $60 | F | $60 | I | $75 | | | | |
| D$^{Rep}$ | $95 | | | D$^{Rep}$ | $95 | | | | |

Standard Auction With Tied Bidders

| Auction 1 | | Auction 2 | | Auction 3 | | Auction 4 | | Auction 5 | |
|---|---|---|---|---|---|---|---|---|---|
| Bidder | Bid | Bidder | Bid | Bidder | Bid | Bidder | Bid | Bidder | Bid |
| A | $95 | D 310 | $95 | G | $85 | J | $95 | D$^{Rep}$ | $95 |
| B | $70 | E | $65 | H | $80 | D$^{Rep}$ | $95+ | N | |
| C | $60 | F | $60 | I | $75 | L | | O | |
| D$^{Rep}$ | $95+ | | | D$^{Rep}$ | $95 | | | | |

Item Dutch Auction
(Before Replication)

| Auction 1 | | Auction 2 | | Auction 3 | |
|---|---|---|---|---|---|
| Bidder | Bid | Bidder | Bid | Bidder | Bid |
| A | 40 @ $99 | D | 40 @ $93 | G | 40 @ $95 |
| B | 30 @ $85 | E | 30 @ $80 | H | 30 @ $75 |
| C | 30 @ $80 | F | 30 @ $75 | I | 20 @ $70 |
| J | 40 @ $75 | K | 50 @ $60 | L | 35 @ $65 |

Independent Auction Results:
    Auction 1:    Bidders A, B and C are filled @ $80.
    Auction 2:    Bidders D, E and F are filled @ $75.
    Auction 3:    Bidders G, H and I are filled @ $65; L receives 10 @ $65.

Figure 7

Item Dutch Auction
(After Replication)

| Auction 1 | | Auction 2 | | Auction 3 | |
|---|---|---|---|---|---|
| Bidder | Bid | Bidder | Bid | Bidder | Bid |
| A | 40 @ $99 | D | 40 @ $93 | G | 40 @ $95 |
| B | 30 @ $85 | E | 30 @ $80 | H | 30 @ $75 |
| C | 30 @ $80 | F | 30 @ $75 | I | 20 @ $70 |
| J | 40 @ $75 | K | 50 @ $60 | L | 35 @ $65 |
| $D^{Rep}$ | 40 @ $93 | $A^{Rep}$ | 40 @ $99 | $A^{Rep}$ | 40 @ $99 |
| $G^{Rep}$ | 40 @ $95 | $G^{Rep}$ | 40 @ $95 | $D^{Rep}$ | 40 @ $93 |

324   322      324   320      322   320

Auction Results: Bidders A and G are filled @ $93; D receives 20 @ $93.

Figure 8

Item Dutch Auction With Tied Bidders
(After Replication)

| Auction 1 | | Auction 2 | | Auction 3 | |
|---|---|---|---|---|---|
| Bidder | Bid | Bidder | Bid | Bidder | Bid |
| A | 40 @ $99 | D | 40 @ $95 | G | 40 @ $95 |
| B | 30 @ $85 | E | 30 @ $80 | H | 30 @ $75 |
| C | 30 @ $80 | F | 30 @ $75 | I | 20 @ $70 |
| J | 40 @ $75 | K | 50 @ $60 | L | 35 @ $65 |
| $D^{Rep}$ | 40 @ $95 | $A^{Rep}$ | 40 @ $99 | $A^{Rep}$ | 40 @ $99 |
| $G^{Rep}$ | 40 @ $95 | $G^{Rep}$ | 40 @ $95+ | $D^{Rep}$ | 40 @ $95 |

344  346        340  342        346  342

Auction Result:  Bidder G takes precedence over Bidder D;
Bidders A and G are filled @ $95; D receives 20 @ $95.

Figure 9

User: Jon
Your current bid is shown in the table below your bid is identified with *

Your Bidding Parameters are:
Item: Identical to requested item #1
       Lawn Mower, Push Rules in Force:

3.5 HP engine Self Propelled, less than 3 years old, folding handle, rear bag, excellent condition, less than $100 need by 8/12/99, prefer, willing to pay 15% above max price for Snapper, Lawn Boy mowers Items Found

| Item | Remote Auction Service | Closing Date | Time Remaining | Current/ Total Bid | Seller Parameters | Bidder ID | Prior Max Bid | Notes on Bidder | Win % |
|---|---|---|---|---|---|---|---|---|---|
| A | 1 | 8/7/99 | 1 HR | $95/$95 | included | Randy | $100 | Bid average of 5 bids per 10 items sought | 10 |
|  | 2 | 8/7/99 | 1:30 | $55/$70 | $15 | *Jon* | N/A | No History | 0 |
|  | 2 | 8/8/99 | 11:00 PM | $40/$60 | $20 | Pete | $50 | Low Bidder | .01 |

Next Bid scheduled at Auction 2 for item A in 1:29:45 for $63.

Figure 14

MULTIPLE AUCTION COORDINATION METHOD AND SYSTEM

CROSS REFERENCE TO RELATED APPLICATIONS

This application is based on and claims filing priority of co-pending U.S. Provisional Application Serial No. 60/152,473, filed on Sep. 3, 1999, entitled, INTERNET-BASED MULTIPLE AUCTION COORDINATION SYSTEM, which is incorporated by reference herein.

BACKGROUND OF THE INVENTION

The present invention relates to auction systems where a user specifies parameters of an item for sale in the auction system and where bidders submit offers for the items for auction.

Glossary

The terms used below are provided to facilitate the understanding of the concepts that are used throughout the claims and specification. It is not meant to in any way limit or constrain the scope but is instead intended to provide representative examples and definitions to assist the readers in their understanding of the present invention. Other examples may additionally be defined in the body of the specification or may be known equivalents in the art for each of these terms.

auction—any dynamic pricing system for sale and purchase of goods and services, where the ultimate price paid by a buyer is not set in advance by the seller, but rather a function of demand and supply as determined during the selling process. An auction may involve buyers competitively bidding for goods and services, sellers competitively offering goods and services, or buyers and sellers converging on a mutually agreeable price and quantity of goods and services to be exchanged.

closing events—any or all of a set of events which may cause an auction to close. These events may include, but are not limited to, some or all of the following: fixed time expiration; period of bidding inactivity; secret or published "sudden death" price hit, where the "sudden death" price may be established prior to the auction or change as a function of auction bidding activity; cancellation of the auction either by the Seller, the remote auction service, or the multi auction service.

item—Any marketable product, service or commodity that can be adequately described and that has a negotiable value discoverable through an auction process. The item may be described and characterized by parameters including quantitative and qualitative values such as a measure of size, shape, weight, quantity, condition, age, uniqueness, etc.

bidder—An entity supplying a bid, either directly or through an agent or network or agents. An agent may be another entity or computer agent. A bidder may be entering bids in real time either directly or through his agent, or may have prespecified a set of rules so that his agent can bid automatically for him.

seller—An entity which may be an individual, company, agent or any third party that may have in their possession or represent the interests of an owner of an item that may be offered for sale at auction, either directly or through an agent.

replicated bid—a bid or bids detected by the multi-auction service for an item at one or more remote auction auction services, which is subsequently transmitted to one or more other remote auction services that did not receive the bid. In substance, the bid replication process allows the optimal bid to appear in all auctions for the item being auctioned as if the original bidder had himself entered identical bids in all auctions for the item. The replicated bid may nominally be identified as coming from the original bidder, coming from the multi-auction service or coming from any other third party.

currency—Any unit of exchange and measure of value, including hard currencies and barter items. Bids in different currencies are compared by using tables managed by the remote auction service. Exchange values may be supplied by the seller, or by a third party and may reflect either real time conversions using guaranteed exchange rates, or alternatively an estimated exchange rate may be employed that is used only for calculation purposes where the real exchange rate is subject to change until the actual closure of the transaction.

memory—The memory means may comprise any type of storage media that may support the recording of the interactions of the service. This may comprise paper records, hard disk storage, random access memory, or any removable or non-removable media that is accessible either directly or remotely by the service. The content of memory would typically comprise, but not be limited to, any or all of the following: information on current and prior bid activity; item selling parameters; seller, bidder or remote auction service profile information, interface protocols and contact information; relative value and auction offering rules specified by the seller, bidder, Multi-Auction Service or remote auction services; transaction data; and marketing data. The memory is accessed by the multi-auction service to record transactions and to provide data which may be analyzed to determine the optimum selling or bidding parameters for an item or item type where the optimized data may be stored in addition to the raw bid information collected.

multi-auction service—System of people, computers and communications systems that coordinate the auction listing, bid replication and auction management process. Typically maintains history of item bids and offers, and identifies categories for auction items. Provides means for bidders or sellers to specify parameters of the bidding and selling process such that the multi-auction service acts as an agent for either the bidder or seller to achieve an optimal bid price and set of transactions from the client's perspective.

optimal bidder—The optimal bidder will usually be the entity that submits the nominally highest bid to the seller and lowest offer for the buyer, but may be adjusted under certain circumstances. For example, if the highest bidder has a questionable credit rating or closing history, or the highest bidder is using a credit card so that his bid needs to be adjusted downward by the processing fees, the nominally highest bid may not be the optimal bid. A database of bidder performance statistics (closing rates, timeliness, seller feedback, etc.) can be factored into the "optimal bid" selection process in order to determine an adjusted bid. When a buyer is using the multi-auction service to achieve an optimal price that is the lowest price, the item offered with the lowest bid may have excessive shipping charges or other ancillary fees that may additionally need to be factored into the bid price as an adjustment. In the case where multiple items are auctioned using a Dutch auction format, the term Optimal Bidder will be used to describe the set of submitting winning bids.

remote auction service—an entity hosting an auction or facilitating the sale of items in an auction style format where the price is a function of demand and supply. May be electronic (eBay, Yahoo, Amazon) or physical (Sotheby's, Christies). May be domestic or international, general or niche specific. The remote auction service need not be a registered auctioneer. It may operate in a manual mode or in a highly computerized mode of operation with respect to the management of an auction. For purposes of this set of specification and claims, if an item appears at a single remote auction service in multiple independent auctions, each instance of the item at a remote auction service is considered a separate and independent remote auction service.

reserve price—a minimum price that a Seller will accept for an item, or a minimum amount a Seller will accept for a batch of similar or dissimilar items.

selling parameters—any or all of a set of parameters describing an Item and how it is to be offered in an auction including, but not limited to, some or all of the following: item description which may comprise in addition to text in various languages, graphic and audio representation such as image file, photograph, audio file, video clip or other content that provides a representation of the item; quantity of items offered or desired; starting date and time; applicable closing events; reserve price; starting bid; expected bid range; auction format (e.g. standard, Dutch, etc); physical item location and shipping arrangements; optimal bid adjustment procedures and currency conversion tables; selling restrictions (e.g. no international, etc.). These parameters may be defined by the seller with assistance by the multi-auction service or may be generated exclusively by the multi-auction service or seller alone.

In the case of "reverse" auctions where a buyer provides parameters for an item to be purchased and sellers offer competitively at successively lower prices to provide the item, the term "selling parameters" should be understood to be those parameters provided by the prospective buyer which describe the item to be purchased and the auction process in which sellers will compete to provide the good or service in question.

Prior art auction methods require a seller to contact an auction service in order to place an item for sale through an auction process. The item is typically transferred to an auction location prior to the auction date. Bidders assemble on the auction date and bid on items of interest. Electronic enhancements have been made to the auction process to allow remote bidders and sellers to engage in auctions for items. These enhancements have typically involved facilitating the auction process while keeping the same general foundation where a user offers a product for auction through an intermediary (auctioneer) that executes the auction and receives bids for the item. At the end of a specified period of time or when no further bids are received, the intermediary closes the auction to further bidding and the highest bidder pays for and receives the item. While the seller and bidder may be represented by other parties, the ultimate control of the auction is performed in a centralized manner where the auctioneer runs the process.

Prior art electronic auction systems on the World Wide Web have implemented a similar methodology to allow more widespread visibility of items to be auctioned to allow sellers to submit items for auction on-line where user's bids from around the world may be received and recorded as the auction progresses. The seller contacts an auction service to indicate that an item is available for sale. The seller identifies the item and specifies the parameters of the auction. The actual auction process is executed by the auction service in accordance with the seller or auctioneer specified rules for the auction of that item. The item does not have to be located where the auction is run, but in order to guarantee the integrity of the auction so that the winning bidder is able to purchase the item, the auction service must have the exclusive right to offer the item. When the auction is over, the highest bidder is contacted and the goods are shipped from the seller to the highest bidder. The terms for the sale are specified in the auction, but the coordination of the shipping is usually arranged between the buyer and seller although some sites provide shipping as an extra service.

In order for a seller to use the auction site, the seller must register and provide an item description. The auction sites may require that sellers provide some means of authentication that the items represented are of the quality described. Different auction sites may have different forms of verification or may require that the item be submitted or shipped to the auction site prior to auction. For those sites that do not require shipping the product prior to auction, the shipping of the product may be arranged between the seller and the buyer or facilitated by the auction service.

While these auction sites provide a means for sellers to offer goods for sale, the seller has to determine the single best auction site for the product to be sold. The seller may receive substantially more or less than expected depending on the number of bidders and what they are willing to pay. The seller can not list an item on more than one site because the winning bidder in each auction rightfully expects to be able to buy the item, of which the seller has only one. Unless a seller is willing to "default", the seller is currently limited to choosing a single auction site for any particular item. It is therefore to the benefit of the seller to choose the best auction site for that type of product. The best site may be the site that has the most user traffic, or it may be a specialized site that offers items for sale in limited classes of products. For example, a coin collector could offer a highly desirable coin for sale at a general auction site such as Ebay, or alternatively the coin collector may choose to place the coin at an auction site that caters to knowledgeable coin buyers. Other services may be provided to show the seller the price of similar products. This may require the seller to investigate different web sites to determine which auction site has the most traffic or has sold similar items at the highest price.

The final sale price is ultimately dependent on the number of bidders for a product at that site and the visibility of that item among all the items being offered at that site. A seller hoping to receive the highest price is therefore limited to the users accessing that web site that are bidding on that product. Auction services have provided users with different means to increase the visibility of the item to be sold by establishing classification methods that allow the user's item to be more frequently retrieved by the search engine. The user typically pays an added amount for preferred placement of their item on the web pages generated. These aspects of placement, while providing better visibility on that web site do not offer the visibility beyond that auction server.

U.S. Pat. No. 5,835,896, METHOD AND SYSTEM FOR PROCESSING AND TRANSMITTING ELECTRONIC AUCTION INFORMATION, assigned to OnSale Inc., discloses an automated system used for auctions on the Internet where the buyer submits bids to the system which validates the bids and ultimately notifies the successful bidder(s) when the auction is over. During the auction process, the server updates the page image stored on the server so new users requesting the page see the most recent bid information. Recently outbid users are notified via email of higher bids. Users may also be represented by automated processes that bid incrementally in an automated fashion up to a predefined user specified value. Different auction types are supported such as Standard Auction, Dutch Auction, and Progressive Auction. A bid closing process called "Floating Closing Time" is additionally disclosed whereby inactivity for a period of time will end the auction of the item prior to the fixed closing time specified in the auction.

U.S. Pat. No. 5,890,138 COMPUTER AUCTION SYSTEM, assigned to Bid.Com International Inc., discloses another Internet based auction system where users access a central database of products to purchase items from a quantity of similar items. The timeframe of the offer is strictly controlled and a number of items are offered where the price decreases until all of the items are sold or until the timeframe of the sale expires. The system updates the displayed availability information at periodic intervals where the period is shortened as the sale comes to an end.

U.S. Pat. No. 5,905,975, COMPUTER IMPLEMENTED METHODS AND APPARATUS FOR AUCTIONS, discloses an auction system where users may define bidding rules that are subsequently enforced throughout the bidding process for an item, thus allowing users to control the amount of time that they are required to devote to the bidding process. The user's system and the auctioneers system communicate automatically to determine how the bidding is incremented according to the rules defined. Complex rules may be implemented where the user may specify quantities of an item to be purchased at various prices.

While these auction sites provide a means for sellers to offer goods for sale, the seller has to determine the single best auction site for the product to be sold. The seller may receive substantially more or less than expected depending on the number of bidders and what they are willing to pay. The seller can not list an item on more than one site because the winning bidder in each auction rightfully expects to be able to buy the item, of which the seller has only one. Unless a seller is willing to "default", the seller is currently limited to choosing a single auction site for any particular item. It is therefore to the benefit of the seller to choose the best auction site for that type of product. The best site may be the site that has the most user traffic, or it may be a specialized site that offers items for sale in limited classes of products. For example, a coin collector could offer a highly desirable coin for sale at a general auction site such as Ebay, or alternatively the coin collector may choose to place the coin at an auction site that caters to knowledgeable coin buyers. Other services may be provided to show the seller the price of similar products. This may require the seller to investigate different web sites to determine which auction site has the most traffic or has sold similar items at the highest price.

The final sale price is ultimately dependent on the number of bidders for a product at that site and the visibility of that item among all the items being offered at that site. A seller hoping to receive the highest price is therefore limited to the users accessing that web site that are bidding on that product. Auction services have provided users with different means to increase the visibility of the item to be sold by establishing classification methods that allow the user's item to be more frequently retrieved by the search engine. The user typically pays an added amount for preferred placement of their item on the web pages generated. These aspects of placement, while providing better visibility on that web site do not offer the visibility beyond that auction server.

What is desired therefore is a methodology of placing an item for auction that has access to and is visible through more than one auction service at the same time where the bids received by any of the auction services affect and are coordinated with each other, such that each service receives and reflects the highest price for that item received by any of the participating auction services.

The objective of the invention is to provide increased visibility of an item to be auctioned by mirroring the item to be offered through a plurality of remote auction services simultaneously whether these services are computerized (e.g. e-bay, OnSale.com, etc.) or manually operated (e.g. Sotheby's, Christie's, etc.). As the auction progresses, when a user bid is entered at one site or service, it is duplicated at the other sites or services where the item has been listed. The server process watches each site and creates a bid on the other sites in real-time that corresponds to the bid made at the first site. The bid replication technology revealed here assures that when the auctions are closed, the winning bid is the same at all sites, and that each bidder who has a right to purchase the item in question can be satisfied. By increasing the number of bids for an item and replicating bids across sites, the price will rise because bidders must compete against other bidders not only at their site, but at all sites on which the item is offered. By listing the item on multiple sites, the seller is gaining visibility for the item and has the most potential to receive the highest ultimate price.

It is also desirable to use the functionality of the service of this invention to provide an optimized method for a bidder to have the multi-auction service place coordinated bids at one or more of a plurality of networked remote auction services for a bidder to enable him to purchase those items at the optimal or lowest prices from the point of view of the bidder. Prior electronic art provides a means for a bidder to have an agent generate automatic bids according to pre-specified rules, which may be complex. However, each set of rules applies only to a single auction and considers bidding activity in only that auction. Contemporaneous bidding activity related to identical items, or similar items which are viable substitutes, occurring at other auctions are not considered. The service of this invention allows a bidder to place an order with the multi-auction service and have the multi-auction service coordinate a bidding strategy for an item or items across remote auction services in order to achieve an optimal result.

SUMMARY OF THE INVENTION

A system and method are disclosed for coordinating an auction for an item between a multi-auction service, a plurality of remote auction services, and a plurality of bidders, all of which are interconnected by a network. The multi-auction service performs the steps of receiving selling parameters for the item to be auctioned from a seller, transmitting the parameters for the item to a plurality of remote auction services, throughout the auction detecting that a bid for the item has been received by at least one of the remote auction services, determining which of the remote auction services should receive a replicated bid, and transmitting a replicated bid to each of the remote auction services so determined. In the case where more than one remote auction service receives a bid for the item, the multi-auction service detects that a bid for the item has been received by more than one of the remote auction services, establishes which of the received bids is an optimal bid for the item, and transmits the optimal bid as the replicated bid to each of the remote auction services.

A networked system is described for coordinating the sale of an item to an optimal bidder across a plurality of remote auction services, where the system comprises a networked multi-auction service system, a plurality of networked remote auction services, and a plurality of bidders. The multi-auction service comprises means for communicating with the plurality of remote auction services, means for replicating the item to be auctioned at the plurality of networked remote auction services, means for detecting a plurality of bids from a plurality of remote auction services, means for determining which of said plurality of detected bids is the optimal bid, and means for replicating the optimal bid across the plurality of remote auction services.

The remote auction services each comprise means for receiving selling parameters for the item to be auctioned from the multi-auction service, means for receiving bids for the item to be auctioned from the plurality of bidders and said multi-auction service, and means for updating the bid for the item to be auctioned.

Each of the plurality of bidders comprises means for bidding on the item to be auctioned at one of the remote auction services.

A method is additionally disclosed for allowing a bidder to communicate with a multi-auction service to request the multi-auction service to selectively place coordinated bids at one or more remote auction service(s) for a plurality of items where one item is desired. This method comprises the bidder specifying to the multi-auction service the item type to be bid upon, the bidder specifying to the multi-auction service the rules for bidding, the bidder or the multi-auction service determining which items at the remote auction services match the bidder requested item, the multi-auction service periodically checking each of the remote auction sites to determine which site and item to bid on, and the multi-auction service placing bids on the item specified at the remote auction services such that a unique and optimal bid is active at only one of the remote auction services at a moment in time and is placed according to the bidder specified rules. In another embodiment, the bidder may specify rules regarding the bidder's preference for one or more identical, or similar, items sought.

BRIEF DESCRIPTION OF THE DRAWING

FIG. 5 is a table of bids in a standard auction mode of the present invention;

FIG. 6 is a table of bids in a standard auction involving tied bidders;

FIG. 7 is a table of bids in a Dutch auction prior to replication;

FIG. 8 is a table of bids in a Dutch auction after replication;

FIG. 9 is a table of bids in a Dutch auction involving tied bidders;

FIG. 14 is a representation of a bidder's interface for monitoring of the bidding process of the present invention

DETAILED DESCRIPTION OF THE PREFERRED EMBODIMENT

The system and method of the present invention provides the ability for a seller or bidder to input parameters of an item to be acquired or sold to achieve the optimal price for the item. For a seller, the system allows sellers to maximize the visibility of the item to be auctioned by replicating the item across a plurality of remote auction services. For a bidder, the system provides the ability for a bidder to specify bid rules to determine where and how to best achieve the purchasing objectives of the bidder across a plurality of contemporaneous auctions being held at a plurality of remote auction services.

Figure 1:
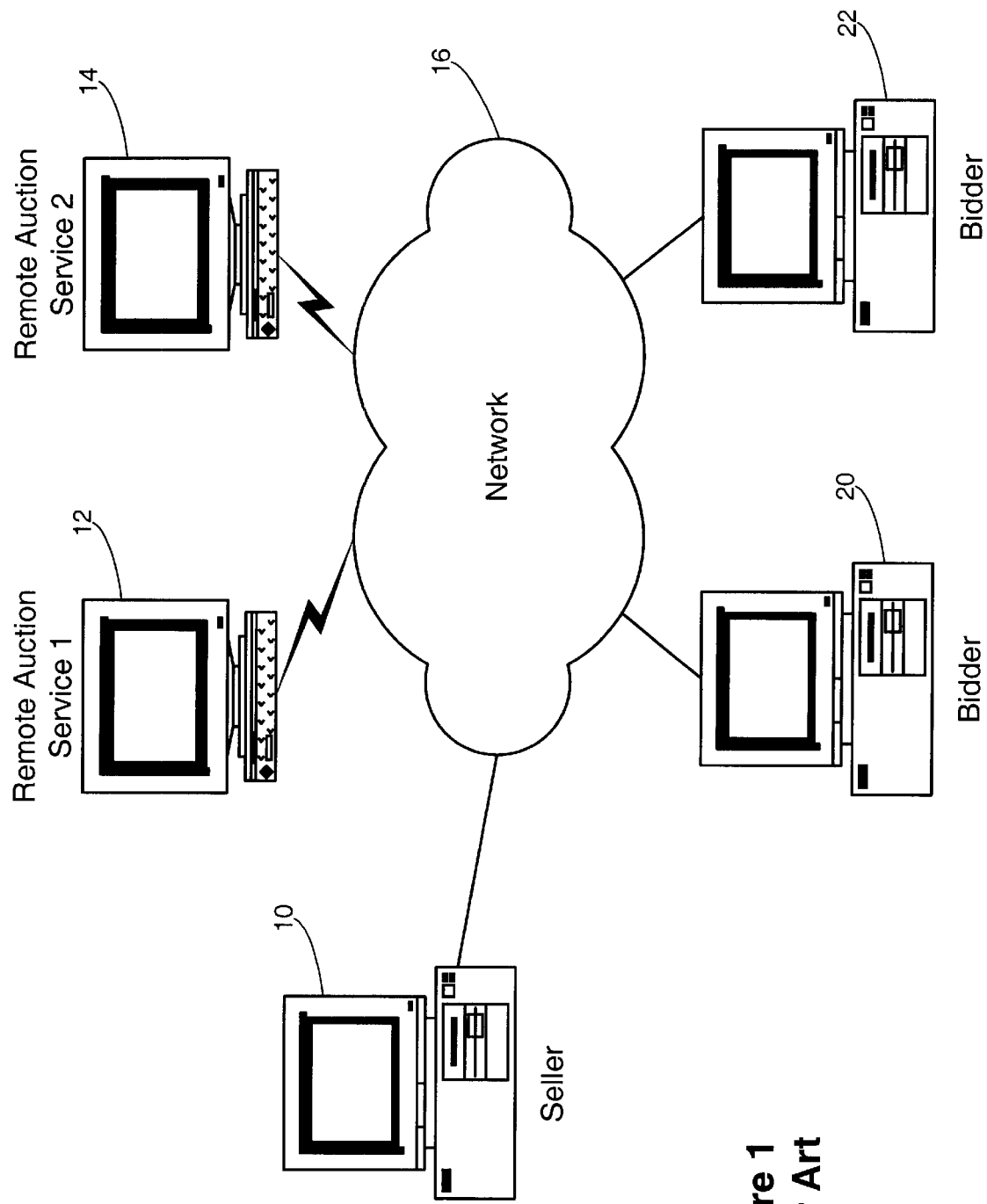
FIG. 1 is a block diagram of the prior art systems involved in Internet-based auctions.

The prior art method of selling and buying items through networked computer-based auction systems will be described with respect to FIG. 1 in order for the user to more fully appreciate the advances afforded by this system for the seller and bidder. For example, in Internet auctions of the prior art, the seller from a seller computer system 10 determines which remote auction service to use to sell the item to be auctioned. The remote auction service for the purposes of this disclosure, may represent an auction service portal such as provided by eBay (remote auction service 12), while auction service 14 may be used to represent the auction services provided by Yahoo. The seller uses a computer 10 to connect over the Internet 16 to one of the services (12 or 14). Supposing the seller selects the eBay service 12, the seller then specifies the description, quantity, auction close date and optionally a reserve price of the object. A plurality of bidders from bidder computers 20,22 may connect to the eBay service 12 to view the seller's description and review prior bid activity or to place a bid on the item. Once the auction begins, bids for the item are processed strictly through the seller selected auction service (eBay) until the close of the auction. The bidders may not bid on this item from any other auction service. The seller 10 then contacts the winning bidder 20 and shipping and payment are arranged between the seller and the bidder. As part of the auction closing process, the auction service 12 charges the seller an insertion fee for running the auction, where the cost is a combination of a fixed listing fee and a fee based on the final sale price of the item. The fee is either charged to an account held for the seller in the remote auction service or the seller's credit card is charged the fee.

Figure 2:
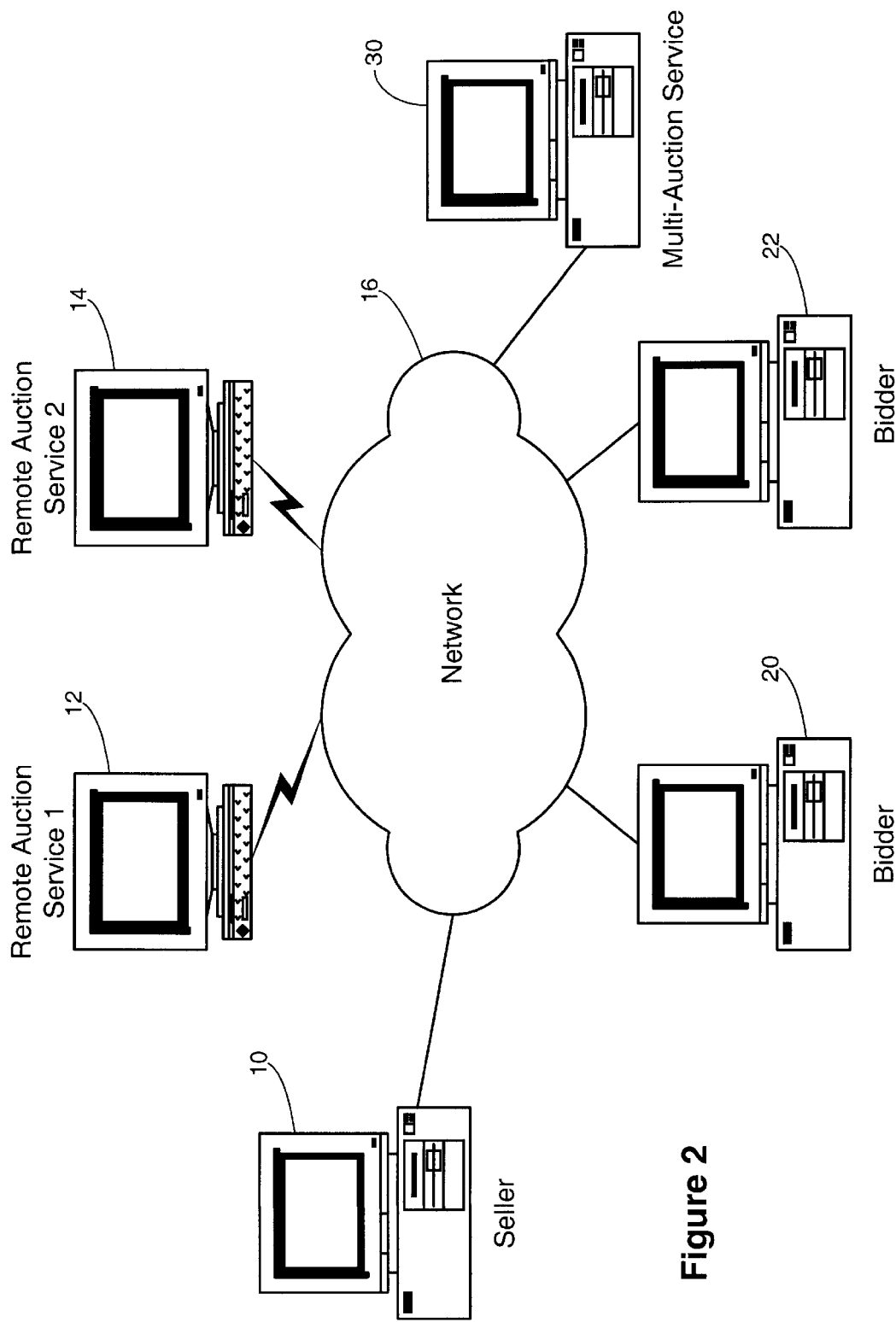
FIG. 2 is a diagram of the computing systems of the multi-auction service system of the present invention.
Figure 10:
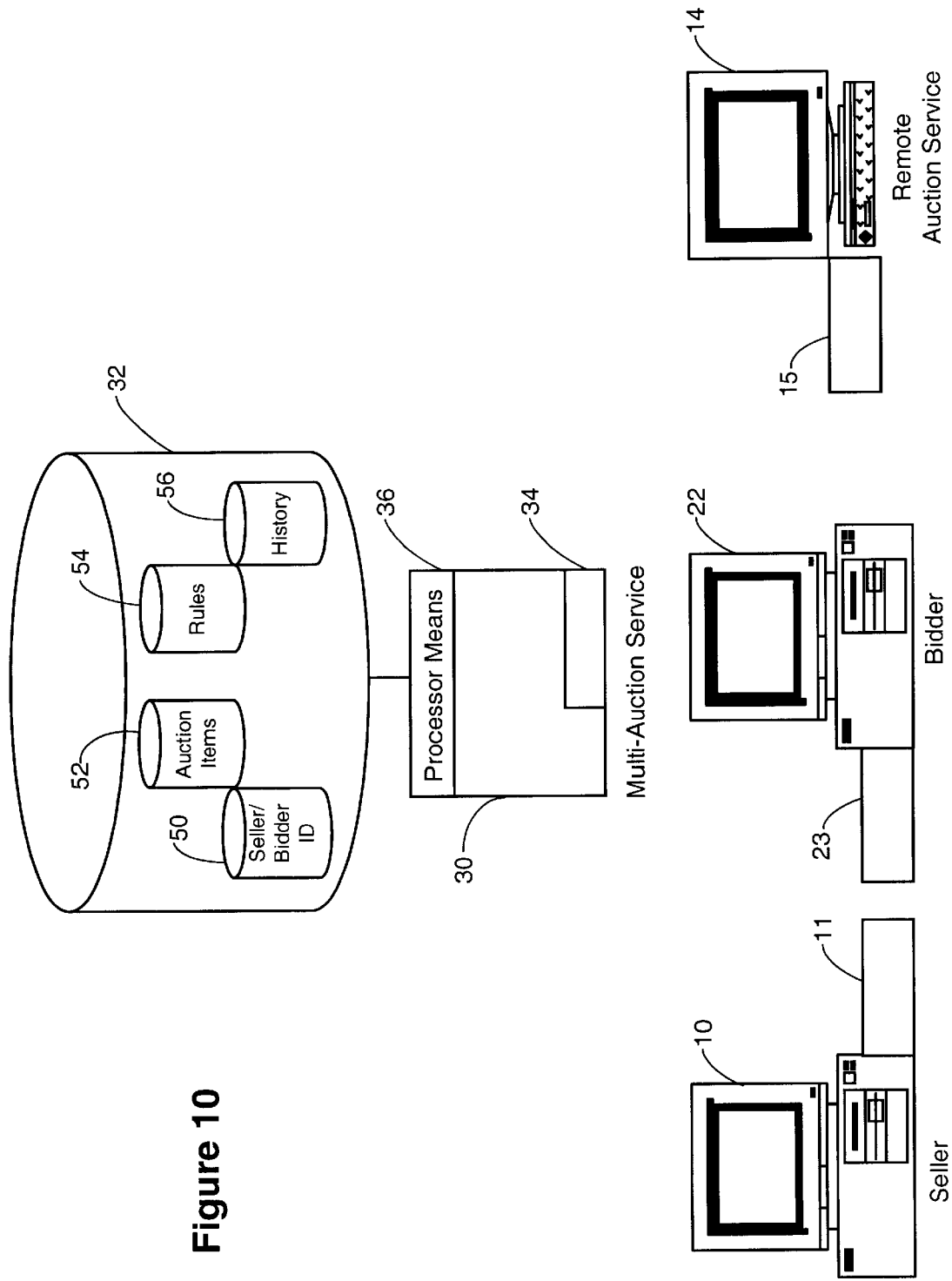
FIG. 10 is a representation of the components of the present invention.

A networked system of the present invention will now be described for implementing a method for coordinating the sale of an item to an optimal bidder across a plurality of remote auction services, where the system comprises a networked multi-auction service 30 (see FIGS. 2 and 10), a plurality of networked remote auction services, and a plurality of bidders. The multi-auction service 30 comprises communications means 34 to transfer selling parameters of the item to be auctioned to the plurality of networked remote auction services 14, processor means 36 comprising means for detecting a plurality of bids from a plurality of remote auction service computers for the item, means for determining which of said plurality of detected bids is the optimal bid, and means for replicating the optimal bid across the plurality of remote auction services.

The remote auction services 14 each comprise communications means 15, processor means comprising means for receiving parameters for the item to be auctioned from the multi-auction service 30, means for receiving bids for the item to be auctioned from the plurality of bidders and said multi-auction service, and means for updating the bid for the item to be auctioned.

Each of the plurality of bidders comprises communications means 23 for bidding on the item to be auctioned at one of the remote auction services.

In the preferred embodiment, the multi-auction service 30 comprises one or more computing devices with memory means 32 (see FIGS. 3, 10) for storing parameters of the items to be auctioned 52, and identification data for the sellers and bidders 50, and selling rules and bidding rules 54; means for communicating 34 for interacting with a plurality of sellers and remote auction services and bidders; processor means 36 comprising: means for detecting bids at the remote auction services; means for item replicating for replicating an item to be auctioned at a plurality of remote auction services, and means for bid replicating for replicating detected bids at remote auction services; and means for determining which bid is an optimal bid and for determining which remote auction services should be contacted. The memory means 32 may comprise any type of storage media that may support the recording of the interactions of the service. This may comprise paper records, hard disk storage, removable media that is accessible either directly or remotely by the service. The seller or the multi-auction service may specify the selling parameters of the offer to include, but are not limited to, some or all of the following: starting date and time; closing date and time; reserve price; a successful bid range; quantity of items; item description which may comprise in addition to text, graphic representation such as image file, photograph; audio file; video clip or other content that provides a representation of the item. These parameters may be defined by the seller with assistance by the multi-auction service or may be generated exclusively by the multi-auction service.

Preferably the memory means 32 comprises a database to contain these items where the individual items are stored as data records that have relationships to the bids received. The means for detecting will be described in detail in the description of the method of the present invention. The functionality of the systems used by remote auction services for receiving bids is commonly known to those skilled in the art and is based on Internet accessibility via the World Wide Web where a plurality of bidders operating from computing devices may submit bids for an item of interest. The remote auction service may be modified in the preferred embodiment to provide enhanced functionality to enable and enhance replication and reconciliation of bids as will be described below.

In contrast to the prior art method of conducting an auction, the method and system of the present invention (see FIG. 2) can additionally be implemented in a completely manual mode of operation or in a partially computerized mode of operation and comprises interaction between a seller 10, a multi-auction service 30, a plurality of remote auction services 12, 14 and a plurality of bidders 20, 22. The multi-auction service 30 can be representative of an agent for the seller that acts on behalf of the seller to coordinate placement of the seller's item at a plurality of auction locations. The plurality of remote auction services 12, 14 can be representative of peer agents or auction houses, that may include local auction locations or internationally known auction facilities, that can accept items for auction and may additionally involve people that relay bids received on the items auctioned, back to the multi-auction service. In this manner, the multi-auction service 30 can have an item listed in paper-based catalogs where the catalog for a particular auction location contains descriptive information about the item to be sold. Prior to the actual auction, a slide image or other representation of the item may be located at each auction house. When the auction takes place, the multiauction service and remote auction service employees involved in the auction process relay the bids between participating auction services and the multi-auction service such that the bid is reflected at each auction location. Sotheby's and Christies for example, provide a catalog for viewing an item in advance of an auction to allow participants to preview the items to be sold. If both of these companies participated in the method of the present invention, they may participate in the bidding via a telephone-based bidding process in addition to receiving bids from the patrons at their auction locations. Bidders may be contacted when the auction begins via telephone or any other interactive device. This network-based relay process with the multi-auction service acting as a hub may alternatively involve devices in addition to telephones such as, pagers, Internet communications devices or any other kind of device that allows local or remote users to participate in the auction process. The multi-auction service participates in the process acting as a hub and relay between each of the remote auction services. The bidders may bid via any of the remote auction services where the multi-auction service 30 coordinates the bids by replicating the bids to the participating remote auction services 12, 14 that are determined by the multi-auction service 30.

In addition to a manual mode of operation, this system may be implemented in a computerized method of operation. In this manner either phone-based communications or computer-based coordination may be employed to replicate bids for an item to be sold. The multi-auction service 30 performs the functions required to provide bid detection and replication for the system. The remote auction service 12, 14 performs the tasks of executing the auction and managing bids received by that remote auction service.

In a simplistic version of the present invention, the method of replicating an item across a plurality of remote auction services comprises the steps of transmitting the selling parameters for the item to be auctioned to the remote auction services; detecting that a bid for the item has been received by at least one of the remote auction services; determining which of the remote auction services should receive a replicated bid; and transmitting the replicated bid to each of the remote auction services so determined.

The replication of the bid may be in the bidders name, sellers name, a third party name or may merely indicate that an "away bid" has been received without identifying the exact source.

In a comprehensive version of the invention (see FIG. 3 and 4) where computers or other communication means are used to coordinate activities, the seller 16 contacts the multi-auction service 30 at step 100, the seller 16 provides identification data to the multi-auction service 30 and provides the selling parameters at step 104. In the preferred embodiment, the multi-auction agent performs an optional check to review historical records at step 110 to determine how similar items have sold. The multi-auction service determines from the historical information the optimal selling parameters to be applied to the items at step 112 and the optimal remote auction service(s) at which to hold auctions.

If the seller has more than one item, at step 116 the items may be sold together or separately. If the items are different but make up a set, they would probably be sold together. Alternatively the items could be auctioned separately, where each item would be described for sale individually at step 120. If the items were the same, different auction methods could be employed to maximize the final auction price of the items. In one method, one item at a time could be released to remote auction services to be auctioned. In another version, the items could be listed as one or more lots to be sold, where multiple bidders may be allowed to bid for less than the quantity available. A reserve price established by the seller may be used to restrict or select the bids that may win the auction by finding the combination of bids for a particular quantity of an item that meet or exceed the total reserve amount specified by the seller. For example if a seller has three items that are to be sold, bidders may be able to bid on one, two or all three of the items, where the bidder specifies in the bid the number requested and the corresponding bid price. The multi-auction service may select a combination of bidders from several remote auction services to be combined to meet the aggregate reserve proceeds established by the seller. The seller may specify that any one item exceeding the unit price as determined from the reserve price and the available quantity, may be sold individually or the seller may accept a combination of bids where higher than reserve and below reserve bids in combination exceed the minimum average bid price. Multiple bidders may also be successful in the Dutch auction format where the bids decrease until the final bid price is determined. These bids are replicated in a similar manner. The seller may determine the closing process to be used in the auction where the selection is based on a number of predefined closing types. The selection may not necessarily be an active step by the seller if a default mode of closing is a predefined or default method.

The means for determining of the multi-auction service determines which remote auction services are to be contacted at step 124. This determination may be based on historical records or known auction locations for similar items, or may be selected by the seller. If the seller alone determines the remote auction services to be involved in the auction process, the multi-auction service would then simply perform those tasks associated with replicating bids. If an item to be auctioned can be listed at step 130 under more than one category or with different descriptive information, the item may be transmitted to the remote auction service more than once where each occurrence is linked to each other by the multi-auction service without causing the remote auction service to perform any coordination functions. The item to be auctioned may therefore be listed once at each remote auction service, more than once in different categories on a remote auction service or more than once in many categories on more than one remote auction service.

The multi-auction service at this point contacts the remote auction services to "list" the item for an upcoming auction. The multi-auction service may use the information determined in the prior steps to generate the descriptive information that is included in the auction request. In the preferred computerized embodiment of the system, the multi-auction service may communicate with the remote auction services through the automated generation of content that matches the input format for each of the remote auction services to be contacted. In one embodiment, a user emulation mode may be utilized to emulate the input of the seller in a batch mode as if the seller provided it by "live" keyboard entry. In more sophisticated systems that provide for automated input of auction items and parameters, the data may be directly transferred to the remote auction server in the form required by that remote auction service selected, thereby bypassing the normal interactive mode of providing content to the remote auction service. In the preferred embodiment, the means for communicating of the multi-auction service contacts each of the remote auction services and relays (transmits) a record for a seller for the remote auction service to process into its system at step 140. In more sophisticated systems, the remote auction service typically generates some type of confirmation number and indicia to identify the item which may then be recorded in memory, file or other storage media of the system by the multi-auction service and is used for subsequent communications.

An item to be auctioned is identified at the remote auction service by the submitting entity where this may refer to the identity of the seller or the multi-auction service may supply contact information indicative of the multi-auction service to the remote auction service. In the case where the item is listed on a remote auction service several times under different nomenclature where each of the references are traceable back to one item for auction, the multi-auction service needs to track the bidding activity to assure that while each appears to be a different item, they are in fact replications of the same item and therefore there can only be a single winning bid across all instances of the item being offered.

The active auction for the item is started by the remote auction services where the multi-auction service detects the bids received by the remote auction service for the item or items at step 144. The multi-auction service determines which of the remote auction services are to receive replicated bids at step 150. The bids are replicated at step 154 at the remote auction services that were determined at step 150. The detection, determining and replication steps are repeated until the end or close of the auction at step 160. The detailed operation of the bidding through closing process steps will be described more fully below.

Figure 3:
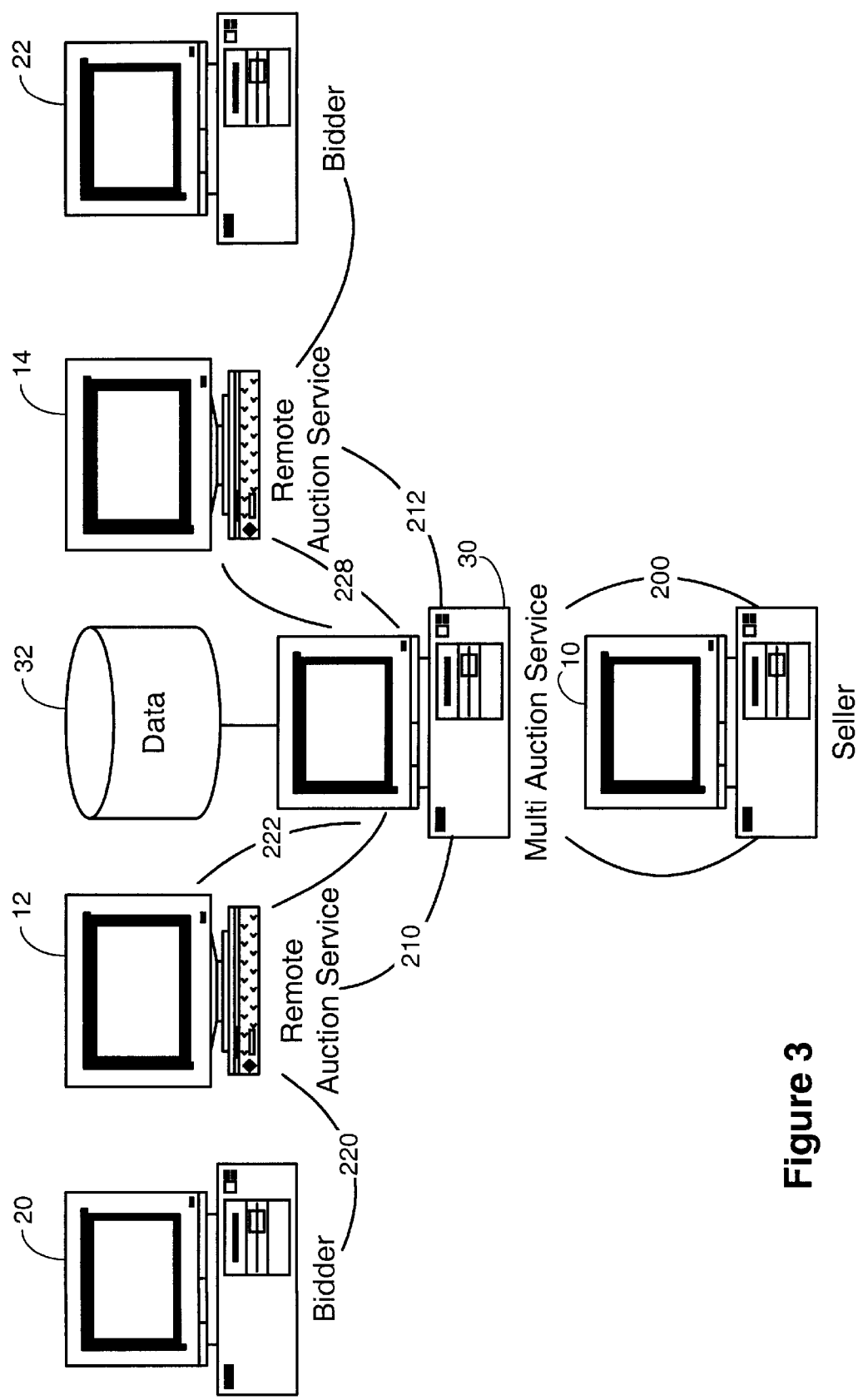
FIG. 3 is a diagram of the bid and replication process steps from the seller's orientation of the present invention.
Figure 4:
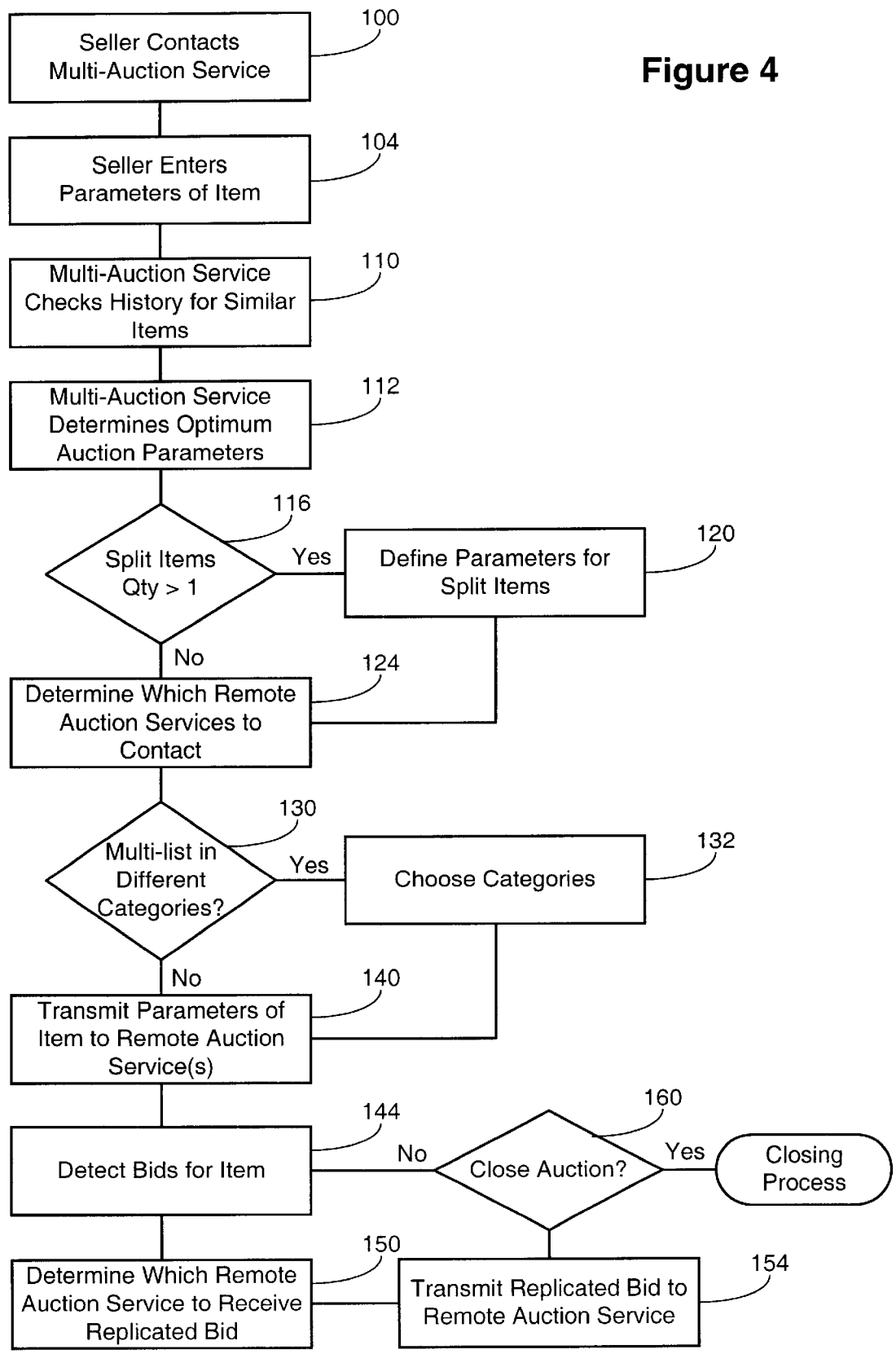
FIG. 4 is a flow chart of the process steps for specifying and replicating bids across a plurality of remote auction services.

A detailed flow of the bid process will now be described with respect to FIG. 3 that describes how an Internet-based bid replication process of the present invention would occur. In the preferred embodiment of a computerized version of the system, following the initial definition of the selling parameters of the item by the seller to the multi-auction service (step 200), the multi-auction service contacts each of the remote auction services (210, and 212) that have been selected to auction the item as previously described. Each of the remote auction services initiates the auction independently of each other as if they had total control of the auction process.

If the bidder 20 makes a bid at remote auction service 12 (step 220), the multi-auction service 30 detects the bid (step 222) by watching each of the items being auctioned by each of the remote auction services to detect when a bid occurs on that item. In the preferred embodiment, this detection may be based on the reception of a message generated by the remote auction service whenever the item receives a bid. This message may be an email notification message, a phone call, instant message to a web browser, a pager message or any other type of communication generated from the remote auction service. Alternatively the detection may be based upon data updates at the remote auction service, where the update reflects a change in the bid amount that is detectable remotely by the multi-auction service. The multi-auction service may use the functionality provided by the remote auction service where a bid causes current bidders or the seller to be notified of bids for the item. If the remote auction does not support this type of notification process the multi-auction service may periodically request a refresh of the bid information for the item. In this manner, a plurality of virtual connections may be established between the remote auction service (web site for Internet-based auctions) for each item's web page and the multi-auction service, where in response to a request for a refresh of the page contents, the remote auction service prepares and sends the response containing the remote current bid information. Upon receipt, the multi-auction service may parse the content received to determine if a change in the bid has occurred as compared to the known bid by the multi-auction service. If more than one bid is detected with the same bid value such that a tie occurs, a priority scheme is used to determine which bid is the optimal bid. The priority scheme would determine an optimal bid that must be selected from bids at the same price level using a combination of any or all of a set of criteria (time stamp, performance statistics of the tied bidders, credit rating, form of payment or other ancillary costs, etc). In a simplified embodiment, this priority scheme checks the time stamp of the bid as stored by the remote auction service. This time stamp is compared between each of the bids having the same bid value to determine which bid is the first received. A local table may be used to synchronize times for each remote service where the time reported is compared to a local standard and the differences or offsets are used to normalize the times such that they are adjusted to one standard. This standard time is used to determine which bid is the first bid received. A correction request may be submitted to the remote auction services representing tied bidders, other than the first received, to modify the current required next bid to the bidding level determined by the multi-auction service or the multi auction service may place a slightly higher bid on these remote auction services in order to "break the tie". If this functionality is not supported, the multi-auction service records the true actual bidder that has the current high value based on this time analysis. This type of reconciliation would not be critical in the middle of the auction, but is significant at the end of the auction and will be addressed during the description of the closing process.

The system can operate where the multi-auction service responds immediately to a message from the remote auction services that a bid has been received and the multi-auction service contacts each of the remote auction services to replicate the optimal detected bid, or the multi-auction service may communicate with each of the remote auction services to retrieve the current bid for the item to identify the optimal bidder from those pending bids prior to replicating that optimal bid. In either case, this optimal bid is then replicated at each of the remote auction service sites except at the remote auction service where the optimal bid originated. In the Dutch auction format, more than one bid detected at more than one remote auction service may need to be replicated across remote auction services.

In one embodiment, the multi-auction service periodically communicates with each of the selected remote auction services where the period is a function of the activities occurring at the auction being executed by the remote auction service. Such activities can include, but are not limited to, some or all of the following: time remaining in the auction, number of active bidders and frequency of bidding activity, proximity of bid level to a "sudden death" price, current bidding increment, and price level of the item. For example, when the period is based on the time remaining to the close of the auction, the multi-auction service may contact each remote auction service less frequently if there is no or intermittent bidding activity on the item. If the bidding is not scheduled to close for a prolonged period of time, the period may be longer. Alternatively, the period may be changed dynamically if an increased bidding activity is detected to increase the frequency of detection and replication at all or at some of the remote auction services. The multi-auction service 30 may contact all of the remote auction services, or may select a modified group of these services such as those that did not receive a bid or those that have been recently active, to receive a replicated bid based on that initially detected bid.

Following the detection event, the bid information may be stored locally in a database 32 associated with the multi-auction service 30. This bidder information is necessary since the system may be required to supply information on the bidder to the remote auction service that ultimately processes the closing bid or to the Seller. This information is also useful in the case that the optimal or winning bidder fails to complete the close of the auction, in order to identify the next optimal bidder who could then be contacted to close the auction of the item.

In the preferred embodiment, since a plurality of remote auction services require that the bidder be registered prior to bidding, the multi-auction service may establish a plurality of user accounts on each of the remote auction services that may be used by the multi-auction service to replicate bids at those sites. The replication of the bid may be in the bidder's name, seller's name, a third party name or may merely indicate that an "away bid" has been received without specifying the exact source. These accounts will be referred to as proxy representatives. These proxy representatives may then be managed by the multi-auction service to allow bids to be placed on the various remote auction services.

Prior to replication, the bidder name, contact information (typically bidder's email identifier, but may include more detailed information such as the network port address if available or other indicia that may become available as technology advances and network components provide more detailed user identification data), and remote auction service identifier (may include node address, name, port, network identifier) are stored in memory as the auction progresses. The processor of the multi-auction service may develop a table of users (bidders and sellers) as items are bid on and offered for sale. The bidder identification information may additionally be compiled into a consolidated database of system users that is used in subsequent references to the user. Bids received for new items may then reference this consolidated table to streamline the data gathering and bidding process. Users may additionally be permitted to supply preference information that can be used by the multi-auction service to contact bidders when items having information related to their preferences are offered for auction by the multi-auction service or its clients.

Bidders of this system may or may not know that their bids are being reflected at different remote auction services using different proxy representatives. The multi-auction service may replicate the actual detected bidder information at the remote auction service as an extension of part of the account name or alternatively may use a system generated identifier or pseudonym to submit the bid for a new bidder at a remote auction service in accordance with the remote auction service's policies.

Referring back to FIG. 3, the multi-auction service 30 transmits a replicated bid to the remote auction service 14 at (step 226, FIG. 3) in response to the detection event step 222. If the remote auction service 14 has the item listed more than once using different descriptive information as previously disclosed, those bids are also updated to reflect the detected bid, as if the duplicate listing occurred on a distinct remote auction service, such that all of the remote auction services display the same bid information for the item.

From the point of view of each remote auction service, the bids all appear to be locally managed and processed exclusively by that service. The local user bidding directly through that service submits the bid using the means provided by this remote auction service. Their bids appear directly on this service. After this bid is detected and replicated on another remote auction service, if a remote local bidder on a second remote auction service, seeing that replicated bid from the first remote auction server decides to submit a higher bid, this bid is detected by the multi-auction service and is replicated back on the first remote auction service. The actual method for submitting replicated bids that may be performed by the multi-auction service may involve emulating the entry of bid data as if the multi auction server were a "live" bidder or formatting that submittal in another form recognizable at the remote auction service. The identification data associated with the replicated remote bid, that is then displayed on the first remote auction service is associated with the multi-auction service proxy representative. This bid also appears to be a local bid to the first remote auction service which processes the bid in the standard manner.

Bids may arrive or be placed in a plurality of "currencies" where there is an equivalency table (either provided by the multi-auction server, the Seller or the remote auction service) for comparing bids. For example, a seller is offering a single item on an auction site in the U.S. and a site in France. French bidders are bidding francs while U.S. bidders are bidding dollars. After the multi-auction service collects the bids, the bids would all be translated to a common unit (most likely dollars), compared and then the optimal bid replicated back in the appropriate currency for that site. The same method of comparison is used for determining what the optimal/lowest bid is for the buyer. In an extension of this system, bids may be placed not only in hard currencies (dollars, francs, etc.) but also barter items. For example, a bidder may bid an airplane flight, which would be translated into dollars using a table so that it could be compared to other barter or hard currency bids. Barter or trade items may additionally be set as reserve values that may be published such that a bidder may see them and provide them as a bid for the item. In general tax effects could be considered as well. In the similar manner the descriptive text of items may be adapted to be translated by the multi-auction service such that either a bidder or seller using the services provided may have their parameters or item descriptions translated from one language into another to either facilitate the specification of the parameters of an item to be auctioned by a seller or purchased by a bidder. Alternatively, users of the multi-auction service may select a language to have auction items of interest converted such that they may review items descriptions in a language of their choice.

Each of the remote auction services attempts to remotely auction the item as if they exclusively offered it. As bids are received for the item, the bid received is relayed to the multi-auction service for the seller or alternatively, the multi-auction service for the seller periodically contacts the remote auction services to check if bids on the item have been received. If the service finds that a bid has been received at the remote auction service while the service is contacting the remote locations to relay other bid information, the newly detected bids are collected and compared to check which is optimal. If the newly detected remote bid is higher than the current bid being replicated, the service contacts the other remote auction services with this new information. If the newly detected remote bid is lower than the current bid being replicated by the multi-auction service, the multi-auction service for the seller continues to replicate the current bid at the other remote auction sites.

The optimal bid will usually be the highest for the seller and lowest for the bidder, but can be something else under specific circumstances controlled by the multi-auction service. For example, the highest bidder may have a questionable credit rating or closing history, or the highest bidder may be using a credit card so that his bid needs to be adjusted downward by the processing fees. A database of bidder performance statistics (closing rates, timeliness, seller feedback, etc.) can be factored into the "optimal bid" selection process in order to determine an adjusted bid. When a buyer is using the multi-auction service to achieve an optimal price that is the lowest price, the item offered with the lowest bid may have excessive shipping charges or other ancillary fees that may additionally need to be factored into the bid price as an adjustment. In the preferred embodiment, these factors that affect the bid are assessed during the bid process such that the buyer and Seller are aware of the impact of these charges on the ultimate bid price to be paid. The multi-auction service may adjust for these factors in an automated or manual manner by requesting this information when in a manual mode or by parsing or retrieving corresponding data elements in a computer augmented mode of operation.

The remote auction services in response to bids from the multi-auction service, may update the posted bid price dynamically on the items at that time of reception, or may indicate that a change is pending for an auction item. This information is usually not relayed to previous bidders unless they request current bid information or to be notified if their bid is exceeded. In this mode of operation when a bidder has not requested to be notified by the remote auction service or the remote auction service does not offer a notification service, a bidder must inquire to receive the current bid of an item at the remote auction service. At that time, the remote auction service looks up the most recent bid information for that item and informs the bidder of the current bid.

The auction process continues until the auction is closed. Several different methods may be employed to close the auction where the end result is that one or several successful bidders are informed that their bid was successful.

In the preferred embodiment, one of the selling parameters of the auction that a seller may define is the method of ending the auction. If the seller specifies that they may end the auction prior to the actual closing date of the auction, the multi-auction service may control the closing process where the remote auction services do not perform the closing steps typically associated with prior art auction methods. In this manner, the multi-auction service may establish an actual closing date that is earlier that the closing dates communicated to the remote auction services participating in the auction. Users bidding on the item are informed that the auction may close prior to the actual closing date due to other circumstances or conditions of the auction. The circumstances may be defined to the users participating in the auction or may only be known to the multi-auction service and seller. One reason for notifying the users of the alternate rules for closing would be to prevent a flurry of bidding in the final moments of an auction where bidders wait to submit a bid until just before the end of the auction hoping to win with a low bid for the item. For example, if bids are not received for an item for some period of time the auction may close. In another type of conditional closing process, a price or proceeds amount may be established such that the first bidder to meet or exceed that price or amount wins the auction. These types of conditional parameters allow for the control of the auction to be managed by the multi-auction service.

In another embodiment of a closing process, assuming that all of the remote auction services can be configured to allow the closing to be determined by the seller, the seller may specify or the multi-auction server may specify that one of the remote auction locations actually know the closing parameters of the auction. For example, if this controlling remote auction service is given the actual closing date of the auction, when the close of the auction occurs at that site, the winning bid is replicated by the multi-auction service and the auction is closed at each of the remote auction sites.

The multi-auction service could additionally act as this controlling remote action service.

The following are some of the possible closing events that may be implemented in this invention
 (a) fixed time expires;
 (b) period of inactivity;
 (c) first bid to exceed either a published or secret "sudden death". This "sudden death" price is different than a reserve price in that the auction can close at a lower price if the sudden death price is not reached—the sudden death price relates only to a price level that will cause the auction to close before its otherwise scheduled close;
 (d) auction type (c) with a decreasing "sudden death" price over time.

Any particular auction can combine these types as well. For example, type "c" may have a type "b" close if the "sudden death" price is not reached.

In another embodiment, the remote auction services cooperatively interoperate with the multi-auction service and provide automated feedback to the multi-auction service as the auction progresses. The remote auction services notify the multi-auction service whenever bids are received. The multiauction service provides coordination data on the closing time of auctions where the remote auction services are notified of the closing time from the multi-auction service dynamically. Any pending bids received prior to that closing time are retrieved or received by the multi-auction service to be compared to each other. The winning bid notice is sent to the remote auction service where the optimal bidder was located. The seller arranges for the transfer of the item with the winner. In this mode, the seller may provide a commission to the remote auction service that had the winning bidder, or alternatively, all participating remote auction services will share a portion of the commission. Other commission payment methods may be optionally arranged prior to the auction by the multi-auction service. The multi-auction service may receive payment for the service provided from the seller, where the payment received is further distributed to the site where the winning bidder was found, or alternatively where each of the sites that participated would receive a payment proportional to the quantity of bids processed at or above the reserve price.

If one of the bidders fails to acquire the item bid for, the multi-auction service provides notification to the seller where the seller determines how the matter will be settled, if he has not already specified a method as part of the selling parameters for the item or items. In one embodiment, the seller contacts the multi-auction service to request the next optimal bidder.

Since the auction will be closed at one or more of the remote auction services, and each remote auction service will attempt to arrange the end of the auction, there may be some delay following the end of the auction to identify the actual winning bidder(s). In the case of a winning bid by a local bidder at the close of the auction, the remote auction service attempts to notify the seller of the winning bidder information according to prior art methods. When the seller is represented by the multi-auction service, the multi-auction service receives the optimal bidder information from the remote auction service and forwards this information to the seller or proceeds to process fulfillment of the order if the Seller has arranged for fulfillment services. The seller or multi-auction service in turn contacts the optimal bidder and attempts to arrange for shipment and payment for the item. When the winning bid on a remote auction service is a replicated bid placed by the multi-auction service, the multi-auction service will be informed that one of its nominees is the winning bidder and will ignore that particular winning bid.

In another embodiment where the closing times are remotely controlled in close synchronicity to each other, as one of the remote auction services indicates the close of the auction, this message is detected and processed by the multi-auction service. If at substantially the same time, other auction sites close that have different best bidders than the first to report the close, the last fully coordinated bidder is notified that they are the winning bidder. The auction is provisionally closed unless the last replicated bidder fails to complete the purchase. At this point the multi-auction service may review the optimal bidder data received from all of the remote services to select the next optimal bid. Other options may alternatively be chosen by the system where other than the last successfully replicated bidder may be the winning bidder. Since the multi-auction service may be the only site that knows the actual seller identification data, no other remote services may directly contact the seller. The multi-auction service can determine the identification information of each of the remote bidders that submitted acceptable bids at the various remote auction service after the closing was indicated at the first remote auction service. The multi-auction service can therefore override the winning bid at the remote auction locations by sending the losers email or other communications specifying that their bids appear to be unacceptable, but that they may be informed within the immediate future if their bid is accepted. This notification may occur in the case where an otherwise optimal bidder previously identified does not complete the purchase. In another embodiment, the optimal bidder is determined by contacting each of the remote auction sites in succession to determine the optimal bidder at that time.

The bids stored in memory of the multi-auction service during the bidding process may be used in subsequent historical analyses of the bids received to aid in implementing future auctions coordinated by the multi-auction service. This information may be statistically analyzed to determine the remote auction services that have the most activity for a class of items, such that only those remote auction services that have significant activity or have provided winning bidders are used in following auctions for similar items. The historical data may also be analyzed to determine the best time of the year, month, week or day to begin and end auctions for a particular type of item. Descriptive information included by the seller may be analyzed to determine the best descriptive text yielding the best closing bid for prior sellers offering similar items for auction. The best descriptive text may be used by the system when a seller offers new items for sale. In one embodiment, the seller is provided with suggested text for the item description that the seller may use as provided, or the seller may modify the suggested text. The seller may additionally view stored images of items previously auctioned that yielded the best bids to assist them in preparing their item for auction.

The multi-auction service may use historical records to determine how similar objects have sold to determine the best manner to sell an item submitted by a seller. Seasonal items for example such as generators or snow removal equipment sell at higher prices before or soon after the season begins. The multi-auction service accesses a memory location which may comprise a file system or computer memory to access those historical records that identify the best times of the year to sell items of that type. The system might be able to use the seller's reserve price to identify the earliest time or statistically best timeframe for a seller to place an item for auction. The historical records may also be used to search for similar products sold to select the best description for the products that statistically return the optimal auction prices. The seller's item would then be given a similar description. The seller may therefore query the history through the multi-auction service prior to submitting an item for auction to choose the best parameters for the auction of the item.

A seller from a seller computer may contact the multi-auction service 30 via an Internet connection, where a user interface to the multi-auction service 30 is provided for the seller to enter selling parameters of the item to be auctioned. Alternatively, Sellers may interface with the multi-auction server via other electronic or manual methods. In the preferred embodiment, the sellers that use this system will be recurring sellers that have products for auction in an ongoing manner, though any seller may use this system. Recurring sellers may subscribe to the multi-auction service where a portion of the subscription payment is directed to the participating remote auction services that allow the multi-auction service to cooperatively function in this modes as previously described. This type of revenue sharing facilitates the coordination aspects of the invention where the multi-auction service is permitted to execute the closing process to determine the winner of the auction where the multi-auction service then contacts the remote auction services to inform them of the winning bidder. In another version of this invention the remote auction services may transmit the bids received to the multi-auction service before posting the optimal bid locally in response to a confirmation message or replication message from the multi-auction service. The remote auction service may store the bid received on their transaction log and display the bid progression for the auction locally, but the optimal bidder will be the bidder as determined by the multi-auction service.

In the preferred embodiment, a network of ancillary business partners are coordinated through the system such that appraisers are provided to assure the quality of the item to be auctioned. Shipping and handling partners may also be established to facilitate and standardize on the methods of shipping the items to be auctioned from the seller to the winning bidder(s). Warehousing partners may be used to temporarily store items to be auctioned and facilitate distribution by the multi-auction service.

When network traffic causes delays in the connection or access to bid information held by remote auction services, the multi-auction service may analyze the times of each bid and other information received at the remote auction sites to determine the optimal in the case of a tie. If no tie exists, the multi-auction service may replicate bids as previously disclosed for the optimal bid received. If one or several of the auctions closed remotely when network problems existed, one of the closing processes previously disclosed may be used to reconcile the bidding.

A tie can occur if a plurality of bidders enter the same bid on the same item at different remote auction services (or instances of the item on the same remote auction service) between multi-auction/remote auction service bid detection times. In this case, the optimal bidder must be selected from bidders who have placed bids at the same price level using a combination of any or all of criteria comprising time stamp, performance statistics of the tied bidders, credit rating, form of payment or other ancillary costs. Other factors may also be used to reconcile the tie. This optimal bidder will be replicated on all remote auction services other than those that have received an identical bid not selected as the optimal bid. In one embodiment, on those remaining remote auction services where the tied bid is not selected as the optimal bid, the bid at that location will be increased to a level even higher than the optimal selected bid in order to "knock out" the tied bidders who were not selected. This tiebreaker bid will be placed in the name of one of the proxy representatives and therefore will not represent a bonafide local bidder from the sellers or remote auction service's perspective.

The data shown in FIGS. 5–9 do not necessarily reflect the time of the bid or the order of bids received at each remote auction service but offered to describe the replication process. For example, in a standard auction format without ties (see FIG. 5), remote auctions services 1, 2, 3, 4, 5 are participating in the auction of an item. Bidders A,B,C are bidding at Auction 1; bidders D,E,F are bidding at Auction 2, bidders G,H,I are bidding at Auction 3, bidder J is bidding at Auction 4, and no one is bidding at Auction 5. The multi-auction service could additionally be included as an auction participant if bidders were bidding from that service.

In this example the multi-auction service does not replicate all bids, but instead periodically replicates bids by identifying the optimal bid at the bid detection time. At the detection time, the multi-auction service contacts each of the remote auction services, (Auction 1–5) to determine the optimal bid. If bidder D (302) had the optimal bid at that point in time, the multi-auction service would contact each of the other remote auction services (1,3,4 and 5) to replicate the bid (304) made by D in the name of one of its proxy representatives.

In the case when a tie exists at the time of the bid detection by the multi-auction service (see FIG. 6), if it is determined that bidder D (310) is the optimal bidder, the bid by D would be replicated (314) at the other remote auction services (Auctions: 3, and 5) as previously described since no tie was detected at those remote auction services. In the preferred embodiment, at Auctions 1,4, the bid by bidder D would be replicated (318) with an indication that the bid of D is a tie but was entered prior to the local bidder's bid. The bid by D (318) is shown with a (+) sign indicating that the value at that remote auction service may have to be raised to the next higher incremental value above the tied bid in order to be accepted. It is anticipated that this incremental value may be coordinated such that the increment is the same at all remote auction services. In another embodiment, depending on the level of compatibility between the remote auction service and the multi-auction service, other indications of a tie may be placed on the bid such as where the replicated bid has its color changed, or the bid flashes on the screen or the bid increment is less than the minimum increment that the remote auction services will permit from regular bidders.

The bid replication methodology additionally changes the way Dutch auctions work. In a normal Dutch auction held at one remote auction service the following occurs: (1) A seller list an item for sale, the item quantity (say 100) and the starting bid (Say $10); (2) Buyers bid on a quantity and price they are willing to pay. Once all 100 items have received a bid of $10.00, the new minimum bid increases, say to $11.00; (3) At the close of the auction, the top 100 bids win at the price bid by the marginal/lowest bidder. In its most straightforward embodiment, the present invention will enable a seller to run parallel Dutch auctions simultaneously on multiple remote auction locations. For example, if there are 100 items offered on each of 5 sites, there appears to be 500 items available. When a marginal bidder bids an amount and quantity on any one remote auction service site, this bid will be replicated on the others, rendering bidders who would have cleared the market considering bids on the replicatee site alone obsolete. At the close of the Dutch Auctions, each Dutch auction will still sell 100 items. However, some of sales will be to actual bidders and the balance will be to proxy representatives representing the multi-auction service. When all the auction winners are combined across sites, there will be 100 local bidders in aggregate that will be expected to take delivery of the items. If the bidder is also a client of the multi-auction service, the multi-auction service will bid on items across multiple Dutch auctions without regard to whether the particular auction represents a unique auction or a replicated auction since there is no difference.

FIG. 7 displays a table of bids received in a Dutch auction format for 100 available items prior to replication by the multi-auction service. If the auction were executed independently without the multi-auction service, if the auction was to close, bidders A,B,C would be filled at $80 if the auction were held exclusively at remote auction service 1; bidders D,E,F would purchase the items at $75 at remote auction service 2 if that service were chosen to host the auction; and bidders G,H, and I would receive their full order at $65 and bidder L would receive only a partial order to fill the 100 available items if the auction were held at remote auction service 3 exclusively. With replication by the multi-auction service, the auction can be held simultaneously at all three locations. The results of the auction are shown in FIG. 8. The highest bids of bidders A,D,G are replicated at the other sites 320, 322, and 324, such that the winners may be distributed across different remote auction services to fill the quantity available according to the prices and quantities offered. In this example bidders A and G would receive their full offer quantity and bidder D would only receive 20 items of the 40 requested. All would pay the accepted optimal bid, generating significantly more proceeds for the Seller than running the auction at any one of the remote service locations exclusively.

In the case of a tie in the Dutch auction format, ties can occur both within a remote auction service or across remote auction services. Ties only matter when there is not sufficient quantity to fill all orders placed at the tied bidders price level. Thus, a tie is not critical unless it involves multiple bidders at the marginal bidders price level. Ties at the marginal acceptable price are typically resolved by ranking the bidders from highest to lowest with respect to quantity bid and then filling orders each order completely until the quantity is exhausted. However, other schemes such as prorating based on bid quantity or time precedence are possible. When two marginal bids are both for the same price level and quantity, time precedence is typically used, but prorating is also possible.

When the multi-auction service encounters a tie at the marginal bid level between bidders, it will select the set of Optimal Bids to fill. Tied bidders will be notionally allocated items based on the various schemes outlined in the previous paragraph. The bid replication methodology is identical to that in the standard Dutch auction, except that the bids of the selected tied bidders may be incremented by one remote auction service price increment 320 prior to any required replication at those remote auction locations where non-selected tied bidders have placed bids (see FIG. 9). Alternatively, the other tie-breaking methodologies previously discussed may be employed. This effectively knocks out the tied bidders who have not been selected at their respective remote auction services by giving them an indication that they need to raise their price level by one increment in order to succeed in the auction. In this example, bidder A has the highest bid, so that bid would be replicated ($A^{Rep}$) 342 according to the processes described referring to Dutch auctions without ties. Bidder G was determined to be the tied bidder that had a priority over bidder D, therefore bidder G would have their bid replicated 340 with the incremented value ($95+) at the bidder D remote auction server (Auction 2). The other sites where bidder G's bid is replicated ($G^{Rep}$) 344 do not indicate the incremental value, but instead their bids may be replicated in the order that the multi-auction service determines. Since bidder D would be the second order ($D^{Rep}$) at that price, bidder D 346 would receive a partial order of the items bid upon at the close of the auction.

The bid replication methodology can also help Sellers increase the price they receive in auctions in the Virtual Buyers Cooperatives format (e.g. Mercatta, Accompany and Act Big auction formats). These auctions are similar to Dutch auctions in that there are multiple identical items available and they will all ultimately be sold at the lowest price that clears the market. In these auctions, unlike Dutch auctions, the quantity of items available is not pre-fixed but rather a function of the level of bidding activity and the prices bid. Bidders place bids for the maximum price they would pay for a quantity of the items. As more and more bidders do this, in some cases the "published price" drops to reflect an aggregate quantity discount appropriate to the aggregate volume of bids across all bids. The market clears at a price acceptable to the seller which reflects this aggregate quantity as if the buyers were banded together to increase their market power. Using the bid replication methodology, a seller can run simultaneous auctions at different locations, aggregating buyers across those locations to either sell the same quantity of items at a higher price than would be achieved at a single location, or alternatively, sell a higher quantity of items than would otherwise be sold at a single location.

The multi-auction server's bid replication methodology helps buyers in reverse auctions in a way analogous to the way it helps Sellers in normal auction formats. In a normal reverse auction, the buyer describes the item they wish to purchase. Criteria may be inputted such as maximum price (similar to a reverse reserve price), or the buyer may list no criteria. The sellers then have an opportunity to offer the item competitively in a format analogous to a bidder bidding on the item. The buyer can accept or reject the offer. In reverse auctions, the buyer would be the client of the multi-auction service and the multi-auction service would list the buyer's request on multiple reverse auction sites. This will expand the visible universe of sellers who will see and offer the item. When a particular seller on a particular site offers on the item, the multi-auction service will use the bid replication methodologies previously discussed to duplicate his marginally lower offer on the other remote auction services, driving down the price for the buyer in all contemporaneous auctions. The bid replication methodology brings the same advantages to the buyer in standard and Dutch reverse auctions as it does to the seller in standard and Dutch auction formats. The auction parameters are similar to those established by a seller (e.g. there can be a reserve price, sudden death price, etc . . . )

The multi-auction service provides through an Internet-based interface comprehensive reporting and auction status functionality where the seller or buyer may for example, interactively affect the current auction by accepting the current bid or offer and immediately closing the auction. The statistics on the bid history may be reviewed in real time to determine frequency of bids or identify bidding anomalies where the bid history is presented in graphical or textual format. Processes executing on the multi-auction service generate the graphical content from the bids stored in the database where all bids detected by this system or optionally only the optimal bids may be recorded.

The system may collect "market data" on losing as well as winning bidders so that targeted e-mail advertising may be directed to the "losers" or the winners of bids. For example, the multi-auction service could send a losing bidder an e-mail saying "We noticed you did not win the auction for the item sought, but there are other identical items available for auction at these locations (or on sale at these retail web sites with which we have negotiated referral fees), etc.". Alternatively, the system could use the losing and winning E-mail addresses to form a mailing list and send targeted E-mails of complementary products or sell the list to other entities.

Figure 11:
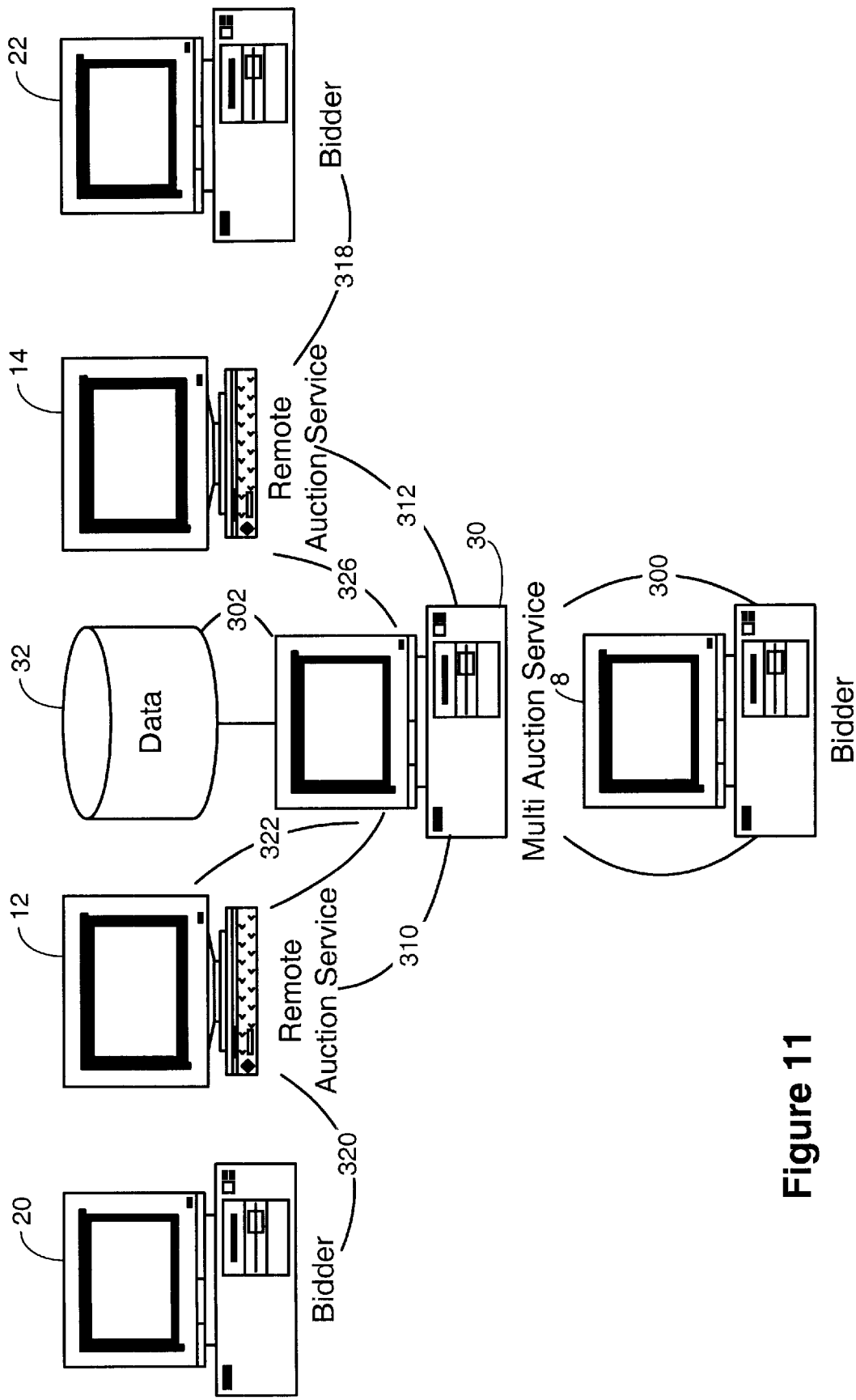
FIG. 11 is a diagram of the bid and replication process steps from the bidder's orientation of the present invention.

The multi-auction service may additionally comprise a local auction functionality that bidders may access directly to specify bidding rules for items. In this capacity, the multi auction service will generate bids based on bidding activity detected at various remote auction services and relay bids for items to remote auction services (see FIG. 11). A bidder may utilize the system and method of the present invention to allow the bidder 8 to place orders for items to be acquired by one or more of a plurality of remote auction services 12, 14, where the method comprises the steps of the bidder specifying to the multi-auction service the item type to be bid upon at step 300; the bidder specifying to the multi-auction service the rules for bidding; the multi-auction service determining which items at the remote auction services match the bidder requested item at step 302 or the bidder supplying this information directly; the multi-auction service periodically checking each of the remote auction services at steps 310, 312 to detect the current bids received at steps 318, 320, of all matching items or to identify new items being auctioned; and the multi-auction service selecting a matching item to bid on and generating a bid at steps 322 or 326 for that matching item on the remote auction service according to the bidder specified rules stored in the memory means 32, such that at least one bid is active or scheduled to be performed on one of the remote auction services at any moment in time.

The method of the current invention may also be used to coordinate the purchase of more than one of the target item. In another version of the invention, relative value rules may be established where a bidder is bidding on two or more similar but not identical items and only wants a certain number. For example, where there are 2 similar stereos and the bidder says "I will pay a 10% premium for stereo B over stereo A, but never more than $350 for either". The system will utilize this rule to identify and bid on the items sought with the rule enforcing the bidding preference. Based on the bids encountered the system may alternately bid on one or the other item as the bids progress until the close of the auction. Bidders may optionally define rules for the total price or individual price not to be exceeded for multiple items for a quantity desired such that the bidding is stopped by the multi-auction service.

Figure 12:
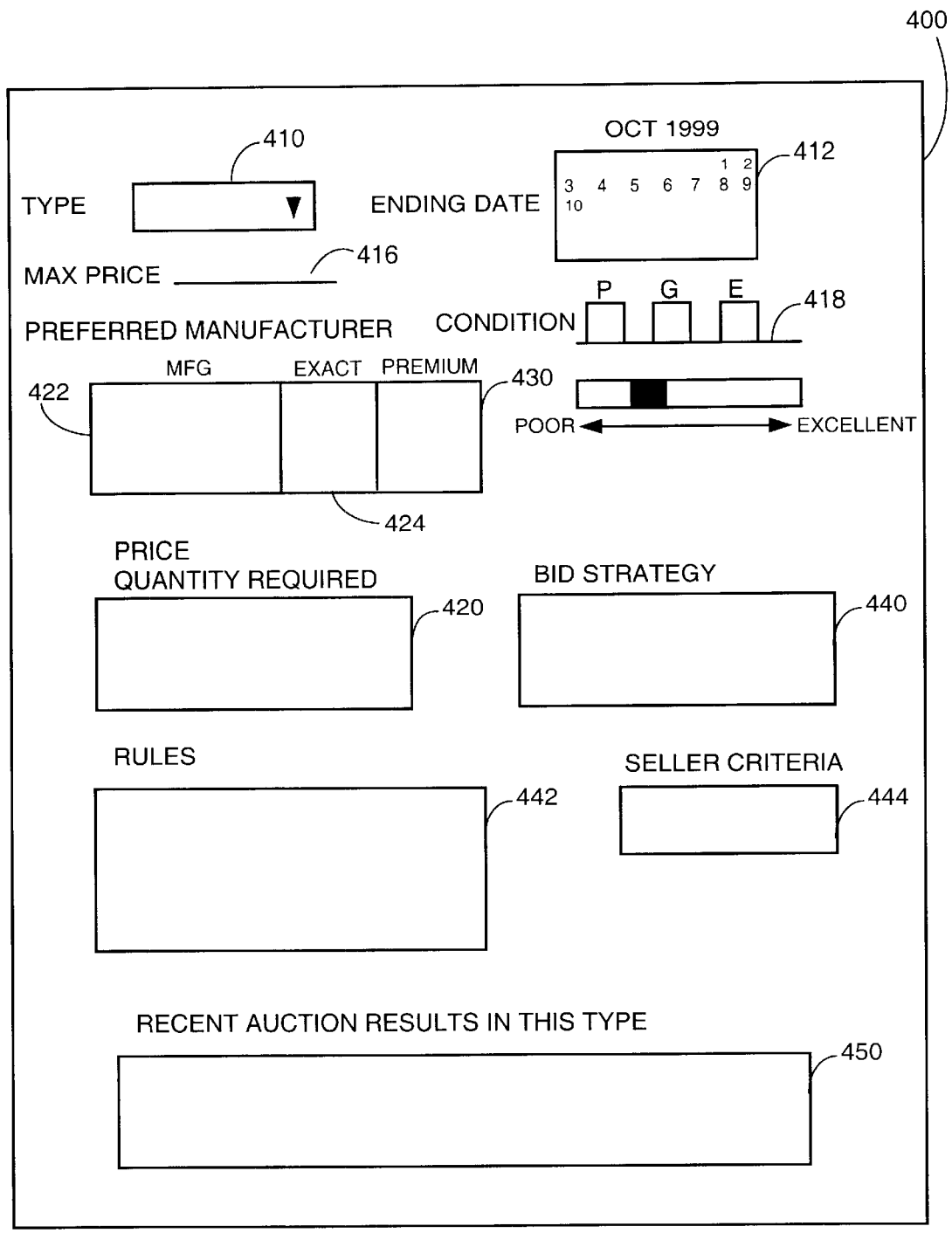
FIG. 12 is a representation of the user interface for the definition of bidder parameters for the present invention.

The bidder may contact the multi-auction service in any manner. In the preferred embodiment, a user interface 400 is provided for the bidder to describe parameters of the items to be purchased (see FIG. 12). The bidder may select from a list of available categorized item types 400 generated by the system or may insert descriptive information of the item to be acquired. An ending date and time for the bidding on this item type may be specified by the bidder using a calendar-like interface 412, or a default timeframe may be specified by the multi-auction server, or open ended bidding may be defined to end on successful acquisition of the item. A maximum price 416 may be established if one or more items are desired and the bidder may specify an average price for the quantity desired 420 where the multi-auction service contacts one or more remote auction services to place bids for one item, two or more of the same items, or similar items where relative value may be placed on the items searched for and bid upon. For example, if the user prefers product manufactured by one manufacturer, the user may specify that preference 422, whether the bidder will accept near substitutes 424, and whether a premium 430 will be paid for one brand or another. The user may specify bid strategies 440 where the strategies have been predetermined for the type of item to be purchased or the user may alternatively define their own rules and preferences for the bid processing in a free form rule area 442 of the interface 400. The multi-auction service may specify a format or supply examples of rules that may be selected or entered by the bidder to allow the multi-auction service to perform the actions associated with implementing the bidding rules. The multi-auction service may additionally suggest optimum bid values and bidding strategies based on historical records of similar items sold from either an internal database 32 or from available data retrieved from a remote auction service. For example, as the data is input by the bidder for the type of object, the historical records may be accessed to populate the data fields with optimum values. When a user specifies the condition criteria 418 for example, the database would be searched to identify similar items sold recently and populate a display area 450 with the results. Additionally, the optimum values may automatically populate the bidder input fields of the user interface where the automatically populated values may be overridden by the bidder. The historical data may optionally be displayed graphically in a chart form showing the normal distribution of final bids based on the strategies used or upon the condition factor of the item. Charts may additionally be prepared indicating the probability of success based on the bidder-defined rules and input values. In the preferred embodiment, the user may indicate a position on the chart to automatically determine rules and strategies to be applied that would determine the best set of conditions to win an auction at a target bid price.

Figure 13:
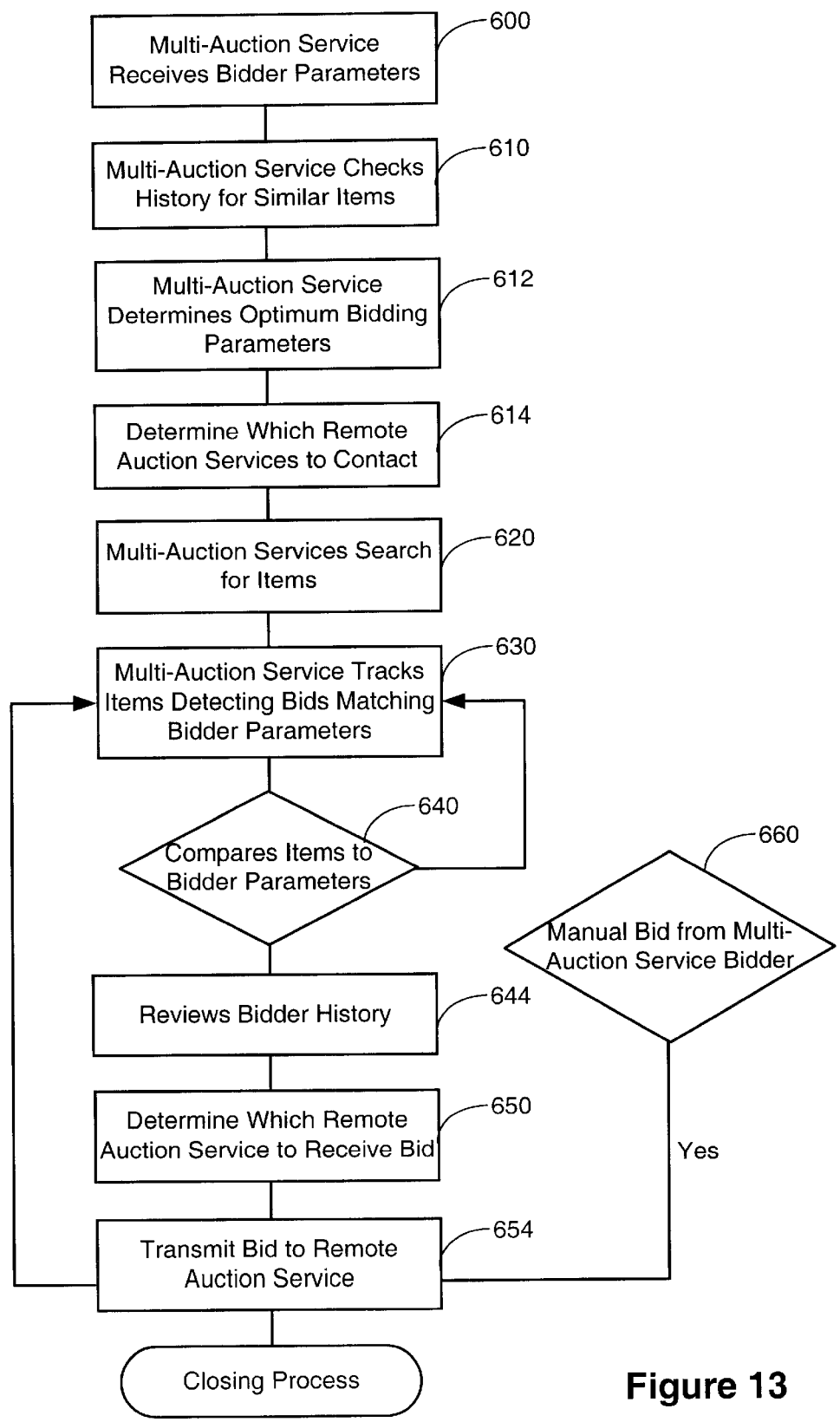
FIG. 13 is a flow diagram of the process steps performed on behalf of a bidder.

The steps performed by the multi-auction service will now be described with respect to flow diagram of FIG. 13. Once the bidder defines the item(s) to be bid upon at step 600, the multi-auction service may review the history database to identify similar items at step 610 and to define optimum bidder parameters at step 612. In addition to the interactive method of defining the item to be bid upon, the multi-auction service may receive requests for bids in other manners where the multi-auction service determines the best parameters without user interaction based on the data received and the historical information retrieved. The multiauction service then reviews the plurality of remote auction services to determine the best sites to search for items at step 614. In the preferred embodiment, the system determines which remote auction services to contact based on prior history for that type of item. Search technologies such as spiders that can find exact or similar items on a variety of auction sites, or a buyer's expressed preferences will be utilized to perform the actual search at step 620. A universal natural language search utility is supported so that users do not need to be experts of the search utilities utilized by the various remote service auctions to find the best item matches. Alternatively, the multi-auction server may use third party search facilities to identify objects being auctioned. The system may review the bidding history of the bidders involved in a particular auction at a remote auction service to determine from past bidding, how likely these bidders are to win. At step 630 the multi-auction service then tracks items matching the item type sought and then compares the items found to the bidder parameters at step 640. The multi-auction service can perform additional analysis on the bid history for that item and review prior bid history by current bidders at step 644 on other objects to determine whether the competing bidders are operating under control of a programmed bidding strategy where the maximum bid for the bidder may be determined from their prior bid activity. In some auctions, bidders wait until the final seconds to bid for items of a particular type where that is the only bid made. The multi-auction service may identify the potential for this type of bidding by reviewing the history of other auctions. The multi-auction service may recommend that the bidder forego bidding on items where current bidders tend to drive prices above the multi-auction bidder specified value maximum price where the top final bid is predicted to be higher than bidder's specified maximum bid.

The detection process disclosed for the seller may be used in a similar manner for bidders at step 630 where the remote auction service is contacted by the multi-auction service to determine the remote auction services that have the lowest or optimal value for an item. The multi-auction service then determines which item to bid upon at step 650 and transmits a bid for that item to the remote auction service at step 654. The multi-auction service cannot strictly find the remote auction services with the lowest bid price, since it is likely that the bidding for that item has just begun. It is better to find the optimal low bids where the auction is about to end and to bid at those remote auction services. The multi-auction service checks the bidding of each item of interest that matches the user defined rules and preferences. If the bids exceed the bidder specified limits stored in a database of rules, that item and site is no longer checked by the multi-auction service and is removed from the tracked items unless a new item comes up for auction that matches a buyer's buying profile. In addition to the automated methods of placing bids the bidder may place manual bids on items at any time at step 660.

The multi-auction service of the present invention additionally provides comprehensive interactive monitoring tools to track bids in progress across multiple remote auction service. The intelligent identification process used to categorize items by type for sellers may be used by bidders to assist in the identification of items in pending auctions. The system may provide suggestions to the users as the bidding progresses or the system may implement expert-based tactical bidding strategies that allow for unattended bidding. For example, an Internet-based interface 500 may be provided for the bidder 8 such that the bidder (Jon) can view his selected item type 502, and the rules in force 510 and the selected remote auction service items 520 being tracked (see FIG. 14). The content for active auctions 520 may comprise an item description 524 which may provide a link to the description of the displayed object, or alternatively may provide a thumbnail image of the item replicated from the remote auction service. A separate reduced size depiction of all of the items being tracked may also be appended to the bottom of the interface such that the user may review them locally without navigating to the remote auction service 526. The parameters of the auction may include for example, the closing date 530 and time remaining 532, current bid 534 (current bid with total bid costs), and remote seller parameters 538. The remote seller data typically might indicate shipping costs or timeframes and may apply other restrictions on the auction. The current bidder information is additionally displayed and comprises the Bidder ID 540, and any bidder notes 546 that may be determined by the multi-auction server restrictions to assist in defining the manner in which the bidder operates. For example, the win percentage 550 may be calculated based on how often that bidder wins when bidding on similar or other types of items. In another example, the remote bidder 22 may be identified as a low bidder that bids late on items where low bid activity has taken place. The bidder may be able to select a bid button 552 to indicate that they would like to manually execute a bid for an item. The user may modify the rules 556 at any point in the bidding process. Additionally the system may indicate the next bid to be performed 560 as selected according to the strategy 440 and rules 442 as were specified by the bidder (see FIG. 11).

In the preferred embodiment, any other type of user interface may be provided that shows substantially similar content such that the bidder may view the activity of the bids, change bid strategy, or place bids for the items shown. Preferably the interface 500 is active such that any changes in the bids are immediately reflected in the form without the bidder having to manually refresh the form.

What is claimed is:

1. A method for allowing a bidder to communicate with a multi-auction service to allow the multi-auction service to selectively place bids at remote auction services for a plurality of items where at least one item is desired, comprising the computer-implemented steps of:
   a) the bidder specifying to the multi-auction service an item or items to be bid upon and their respective bidding parameters;
   b) the bidder specifying to the multi-auction service at least one rule for bidding on similar or dissimilar items across auctions;
   c) the multi-auction service periodically detecting the current optimal bid of the item at each of the respective remote auction services;
   d) the multi-auction service generating and transmitting bids on the item or items such that an optimal bid for the bidder is active via at least one of the remote auction services if permitted by the at least one rule.

2. The method of claim 1 wherein if the quantity available is greater than one, the bidder may bid on up to the available quantity.

3. The method of claim 1 wherein the bidder is not identified directly at one or more remote auction services and the bidder's identity is concealed.

4. The method of claim 1 wherein at least one item identifier and at least one rule for bidding is stored in memory associated with the multi-auction service.

5. The method of claim 1 wherein at least one rule specifies at least one of the maximum payment the bidder is willing to pay for the item and the duration of the bid to buy the item.

6. The method of claim 1 wherein at least one rule specifies that similar items are sought by the bidder where the bidder has a preference for one of the similar items as expressed by either a willingness to pay a premium for the item or other expressed preference scheme.

7. The method of claim 1 wherein the timing of transmitting replicated bids is based on the time remaining to the close of the auction, level of bidding activity at the auction, proximity of the current bid level to a reserve or sudden death price, or the value of the item being auctioned.

8. The method of claim 1 wherein the periodicity of the multi-auction service probing one or more remote auction services in order to detect that bids have been received by one or more remote auction services is based on time remaining to the close of the auction, level of bidding activity at the auction, proximity of the current bid level to a reserve or sudden death price, and/or the value of the item being auctioned.

9. The method of claim 1 further comprising the step of the multi-auction service requesting or responding to a request by the remote auction service seller that bidding is to be suspended at the determined remote auction services.

10. The method of claim 1 wherein the bids placed on various remote auction services are denominated in different currencies, further comprising the step of translating the currency of the bid into another currency in order to facilitate a comparison of value.

11. The method of claim 1 wherein the bids placed on various remote auction services are denominated in different currencies, further comprising the step of translating the replicated bid into the appropriate currency for the particular remote auction service prior to transmitting the bid.

12. The method of claim 1 wherein the multi-auction service determines that a closing event has occurred based on the selling parameters for the auction and/or indicia received from one or more remote auction services and initiates a closing process that signals the end of the auction.

13. The method of claim 12 wherein the closing process comprises at least one of the steps of:
  a) communicating with a seller the optimal bid(s) received and the optimal bidder(s);
  b) communicating with the bidder his status as the optimal bidder;
  c) communicating with remote auction services from which optimal bids originated;
  d) communicating with remote auction services from which optimal bids did not originate;
  e) communicating with "backup" bidders their status in the event the optimal bidder fails to perform;
  f) calculating and reconciling fees associated with the auction;
  g) coordinating payment of the fees with participants;
  h) coordinating payment of the item by the bidder to the seller;
  i) shipping the item to the bidder;
  j) communicating with the buyer after the sale to assess satisfaction; and
  k) making data related to the bidders and auction activity available as marketing data to third parties.

14. The method of claim 12 wherein detecting that a closing event has occurred comprises periodically communicating with each of the selected remote auction services.

15. The method of claim 12 wherein the closing process comprises comparing the optimal bid or bids to a reserve price or amount established by the seller (or established by the bidder in the case of "reverse" auctions).

16. The method of claim 12 further comprises the step of communicating the existence of a closing event to the determined remote auction services.

17. The method of claim 12 wherein the multi-auction service determines that a closing event detected or initiated at a remote auction services should trigger the premature close of auctions at other remote auction services and communicates such to the other remote auction services.

18. The method of claim 1 further comprising verifying that the transmitted bids were successfully replicated on the remote auction services so determined by comparing a current remote auction service bid to a previous optimal bid intended to be replicated.

19. The method of claim 1 further comprising storing detected bids and bidder identifiers for items in memory of the multi-auction service for a variety of uses, including but not limited to identifying optimal and substitute bidders, and developing bidder data to be marketed to the seller and/or other purveyors of services.

20. The method of claim 19 wherein an alternative optimal bidder is selected if an original optimal bidder does not perform.

21. The method of claim 19 further comprising the step of analyzing the bid history for items in order to determine the efficacy of any or all of the following: auction formats; various remote auction services; auction duration and timing; closing events; expected closing price range; descriptive text, graphics, video and audio.

22. The method of claim 19 further comprising the step of providing a database reporting system for clients to monitor and track bidding and transaction activity occurring on remote auction services on selected items.

23. The method of claim 1 further comprising the step of the multi-auction service determining which item at the remote auction services match the bidder criteria for items to be bid upon.

24. The method of claim 1 wherein the item to be auctioned is not split into multiple lots and is auctioned as a single lot at more than one remote auction services concurrently by replicating and coordinating the auction at more than one remote auction service.

25. A networked system for coordinating the sale of an item to an optimal bidder across a plurality of remote auction services comprising:
  a) a networked multi-auction service system comprising:
    i) means for communicating with the plurality of remote auction services;
    ii) means for replicating the item to be auctioned at the plurality of networked remote auction services;
    iii) means for detecting a plurality of bids from a plurality of remote auction services;
    iv) means for determining which of said plurality of detected bids is the optimal bid;
    v) means for replicating the optimal bid across the plurality of remote auction services;
  b) the plurality of networked remote auction services each comprising:
    vi) means for receiving selling parameters for the item to be auctioned from the multi-auction service or sellers directly;
    vii) means for receiving bids for the item to be auctioned from the plurality of bidders and said multi-auction service;
    viii) means for updating the bid for the item to be auctioned; and
  c) a plurality of bidders comprising means for bidding on the item to be auctioned at one or more of the remote auction services.

* * * * *